(12) United States Patent
Levytan et al.

(10) Patent No.: US 11,612,294 B2
(45) Date of Patent: Mar. 28, 2023

(54) DEVICES FOR MOVING ON VERTICAL SURFACES, TOOLS FOR CLEANING VERTICAL SURFACES AND SYSTEMS FOR CLEANING VERTICAL SURFACES

(71) Applicant: VEROBOTICS LTD., Tel Aviv-Jaffa (IL)

(72) Inventors: Itay Levytan, Rishon Lezion (IL); Ido Genosar, Tel Aviv-Jaffa (IL)

(73) Assignee: VEROBOTICS LTD., Tel Aviv-Jaffa (IL)

( * ) Notice: Subject to any disclaimer, the term of this patent is extended or adjusted under 35 U.S.C. 154(b) by 0 days.

(21) Appl. No.: 17/888,884

(22) Filed: Aug. 16, 2022

(65) Prior Publication Data

US 2023/0054334 A1    Feb. 23, 2023

Related U.S. Application Data

(60) Provisional application No. 63/233,876, filed on Aug. 17, 2021.

(51) Int. Cl.
*A47L 11/38* (2006.01)
*B62D 57/024* (2006.01)
*A47L 11/40* (2006.01)

(52) U.S. Cl.
CPC .......... *A47L 11/38* (2013.01); *A47L 11/4011* (2013.01); *A47L 11/4036* (2013.01); *A47L 11/4061* (2013.01); *B62D 57/024* (2013.01)

(58) Field of Classification Search
CPC .... A47L 7/38; B60S 1/38; B60S 1/524; B60S 3/06; B62D 57/024

USPC .......................................................... 15/21.1
See application file for complete search history.

(56) References Cited

U.S. PATENT DOCUMENTS

2020/0129017 A1    4/2020 Erylon

FOREIGN PATENT DOCUMENTS

| CN | 112137523 A | * 12/2020 | ............ A47L 11/38 |
| CN | 112315389 A | * 2/2021 | ............ A47L 1/02 |
| CN | 113040671 A | * 6/2021 | |
| WO | WO 2019040975 | 3/2019 | |
| WO | WO 2019229471 | 12/2019 | |

OTHER PUBLICATIONS

International Search report of Application No. PCT/IL2022/050888 dated Nov. 28, 2022.
Imaoka, Noriaki, et al. "SkyScraper-I: Tethered whole windows cleaning robot." 2010 IEEE/RSJ International Conference on Intelligent Robots and Systems. IEEE, 2010 Imaoka, Noriaki, et al. Dec. 31, 2010 (Dec. 31, 2010) the whole document.
Liu, Jihong, et al. "A small window-cleaning robot for domestic use." 2009 International Conference on Artificial Intelligence and Computational Intelligence. vol. 2. IEEE, 2009 Liu, Jihong, et al. Dec. 31, 2009 (Dec. 31, 2009) the whole document.

* cited by examiner

*Primary Examiner* — Michael D Jennings
*Assistant Examiner* — Aaron R McConnell
(74) *Attorney, Agent, or Firm* — Pearl Cohen Zedek Latzer Baratz LLP

(57) ABSTRACT

Devices for moving on substantially vertical surfaces, tools for cleaning substantially vertical surfaces and systems for cleaning substantially vertical surfaces are disclosed.

22 Claims, 24 Drawing Sheets

Fig. 1B   Fig. 1C

DEVICES FOR MOVING ON VERTICAL SURFACES, TOOLS FOR CLEANING VERTICAL SURFACES AND SYSTEMS FOR CLEANING VERTICAL SURFACES

CROSS-REFERENCE TO RELATED APPLICATIONS

This application claims priority to U.S. Provisional Application No. 63/233,876 filed on Aug. 17, 2021, which is incorporated herein by reference in its entirety.

FIELD OF THE INVENTION

The present invention relates to the field of devices for moving on vertical surfaces, tools for cleaning vertical surfaces and systems for cleaning vertical surfaces, and more particularly, to automatic devices, tools and systems thereof.

BACKGROUND OF THE INVENTION

Typically, vertical surfaces of high buildings, such as windows and walls of skyscrapers, are cleaned manually by high rise cleaning professionals. Current difficulties associated with manual cleaning can include falling risk, imprecision of human labor and/or unavailability of human labor. There is a long-felt need in automatic devices, tools and systems for cleaning vertical surfaces of high buildings.

SUMMARY OF THE INVENTION

Some embodiments of the present invention may provide a device for moving on a substantially vertical surface, the device may include: a frame; a first arm connected to the frame and rotatable with respect to the frame about a first axis; a first vacuum suction cup connected to the first arm; a second arm connected to the frame and rotatable with respect to the frame about a second axis that is substantially parallel to the first axis; a second vacuum suction cup connected to the second arm; a vacuum pump in fluid communication with the first vacuum suction cup and the second vacuum suction cup; a first valve to control generation of vacuum in and release of vacuum from the first vacuum suction cup; a second valve to control generation of vacuum in and release of vacuum from the second vacuum suction cup; and a controller to control: rotations of the first and second arms, and operation of the vacuum pump, the first valve and the second valve.

Some embodiments of the present invention may provide a tool for cleaning a substantially vertical surface, the tool may include: a body having a first body end, a second body end and a central longitudinal body axis extending between the first and second body ends; a cable connector to connect the body to a cable, one or two brushes each rotatably connected to one of the first or second body ends; one or more propellers disposed on the body, wherein at least one of the one or more propellers to generate thrust at least in a direction that is substantially perpendicular to the central longitudinal body axis to push the tool against the substantially vertical surface; and a cleaning tool controller to control rotations of the one or more propellers.

Some embodiments of the present invention may provide a system for cleaning a substantially vertical surface, the system may include: a device for moving on the substantially vertical surface, the device may include: a cleaning tool connector, a frame, a first arm connected to the frame and rotatable with respect to the frame about a first axis, a first vacuum suction cup connected to the first arm, a second arm connected to the frame and rotatable with respect to the frame about a second axis that is substantially parallel to the first axis, a second vacuum suction cup connected to the second arm, a vacuum pump in fluid communication with the first vacuum suction cup and the second vacuum suction cup, a first valve to control generation of vacuum in and release of vacuum from the first vacuum suction cup, a second valve to control generation of vacuum in and release of vacuum from the second vacuum suction cup, and a controller to control: rotation of the first arm and the second arm, and operation of the vacuum pump, the first valve and the second valve; and a cleaning tool connectable to the cleaning tool connector, the cleaning tool is movable with respect to the device in a substantially vertical direction to clean the substantially vertical surface.

Some embodiments of the present invention may provide a system for cleaning a substantially vertical surface, the system may include: a rail mountable on top of the substantially vertical surface; a slider movable along the rail and including, the slider including a cleaning tool connector; and a cleaning tool connectable to the cleaning tool connector, the cleaning tool is movable with respect to the slider in a substantially vertical direction to clean the substantially vertical surface.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings:

FIGS. 1A, 1B, 1C, 1D and 1E are schematic illustrations of a device for moving on a substantially vertical surface, according to some embodiments of the invention;

FIGS. 1H and 1I are schematic illustration and 3D diagram, respectively, of the device for moving on the substantially vertical surface and including a sub-frame for horizontal stabilization of a frame thereof, according to some embodiments of the invention;

Figure 1A:
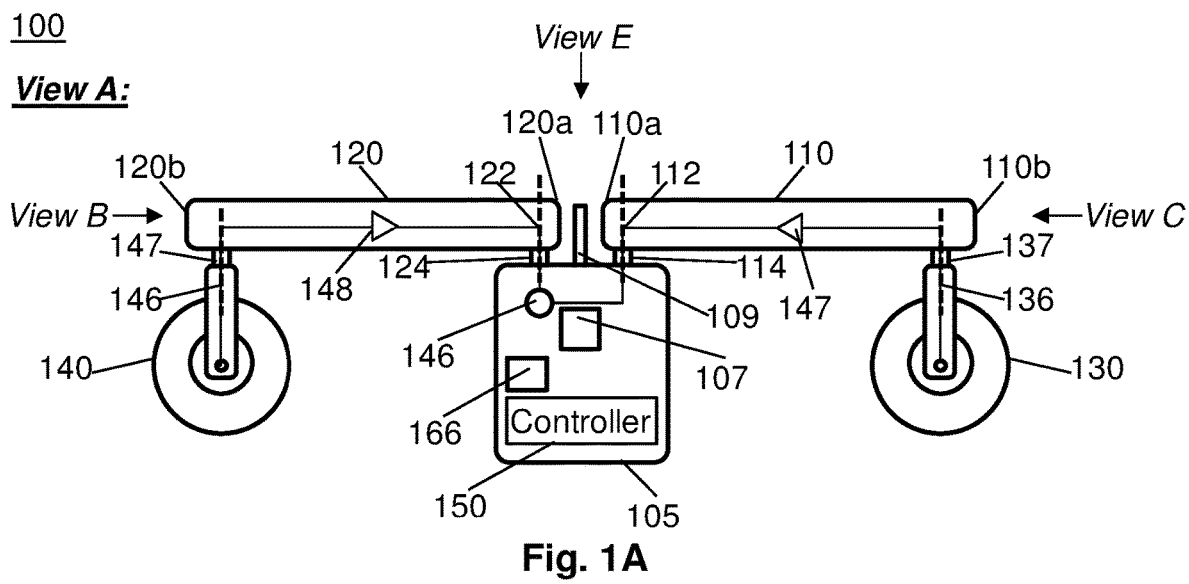
Figure 1A:
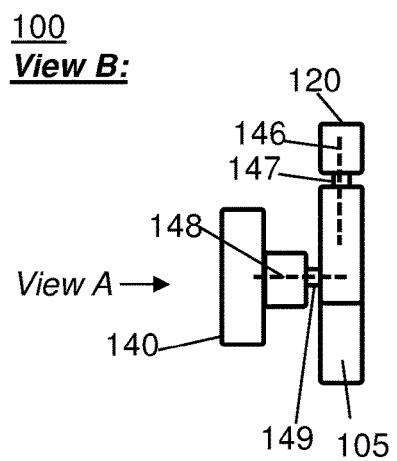
Figure 1A:
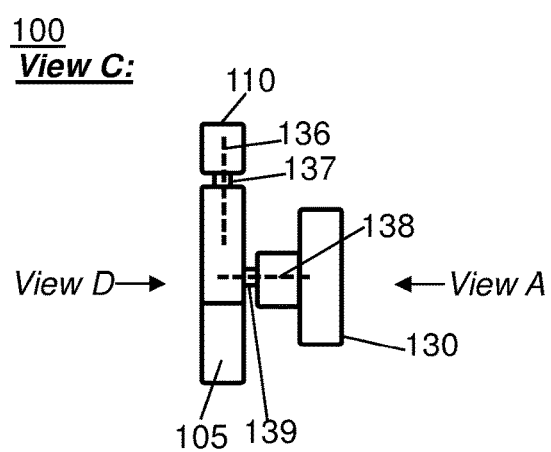

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Figure 1D:
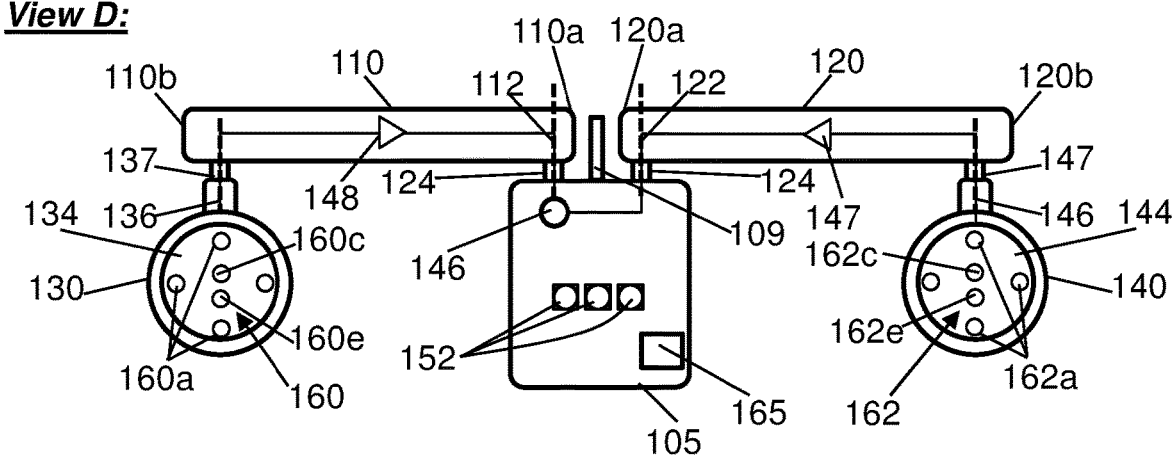
Figure 1E:
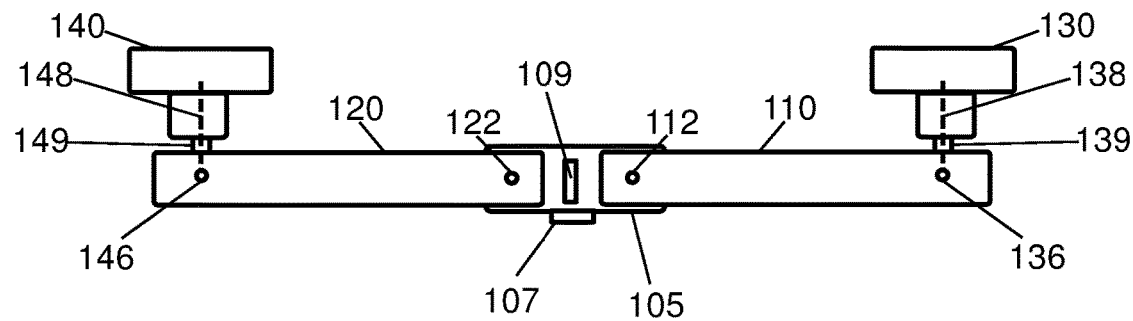
Figure 1F:
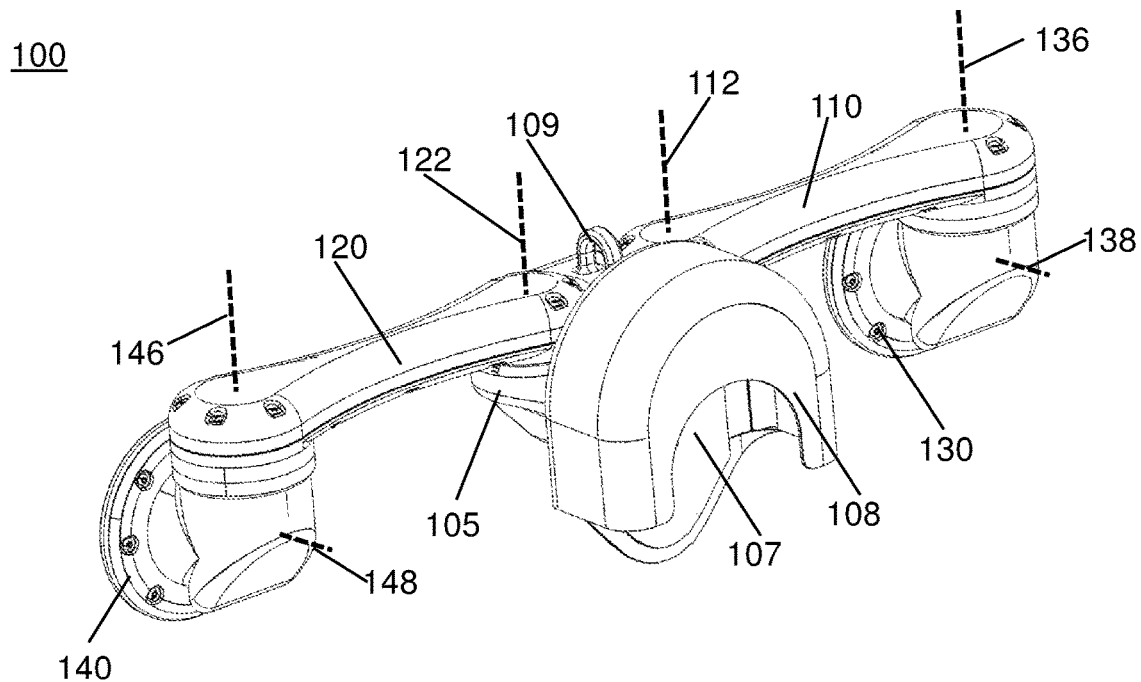
FIGS. 1F and 1G are 3D diagrams of the device for moving on the substantially vertical surface, according to some embodiments of the invention.
Figure 1G:
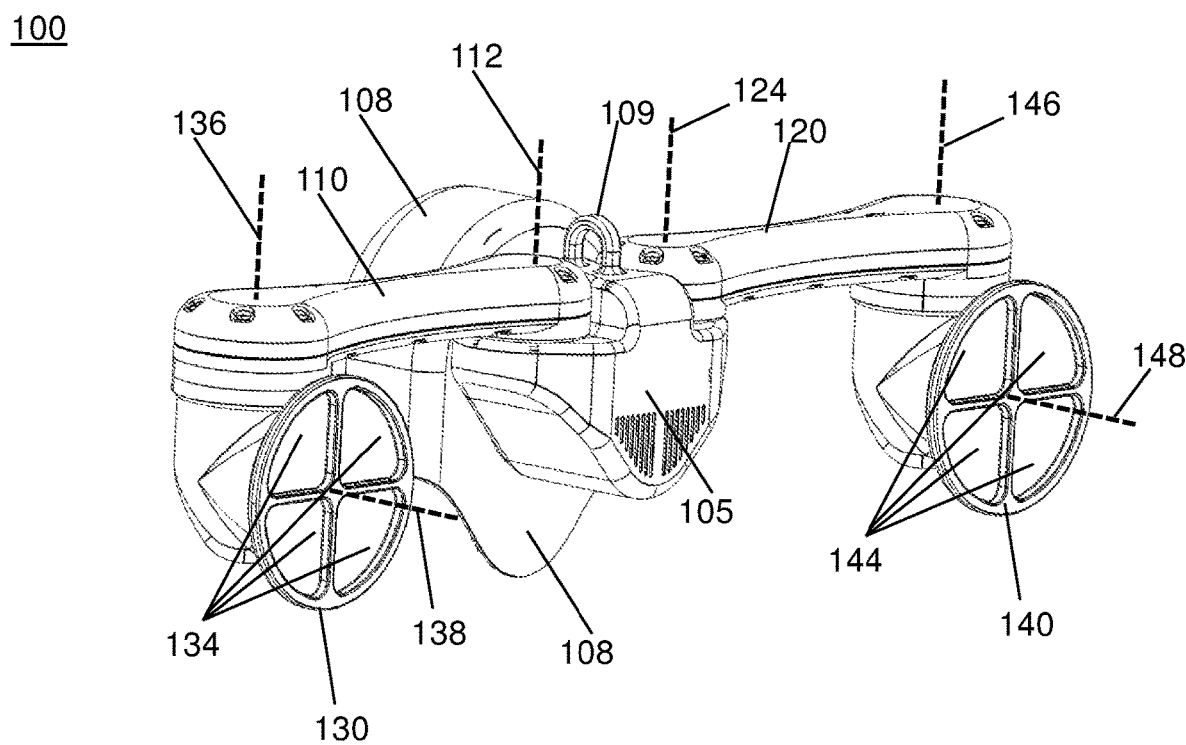

Reference is now made to FIGS. 1A, 1B, 1C, 1D and 1E, which are schematic illustrations of a device 100 for moving on a substantially vertical surface, according to some embodiments of the invention. Reference is also made to FIGS. 1F and 1G, which are 3D diagrams of device 100 for moving on the substantially vertical surface, according to some embodiments of the invention.

Device 100 may move on vertical (or substantially vertical) surfaces such as, for example, walls and/or windows of buildings. The substantially vertical surface on which device 100 may move may be slightly inclined with respect to a normal to the ground surface, e.g. at an angle from 0 to 20 degrees or more. Device 100 may move on the vertical (or substantially vertical) surface in horizontal directions and/or in vertical directions.

Device 100 may include a frame 105. Device 100 may include a tool connector 107. Tool connector 107 may be connected to or may be part of frame 105. Tool connector 107 may connect a tool to device 100. For example, a tool for cleaning vertical surfaces (e.g., such as tools 600, 900, 1000 described hereinbelow) may be connected to device 100 by tool connector 107. Additional tools that may be connected to device 100 using tool connector 107 may include cameras (e.g., infrared cameras, etc.), inspection tools (e.g., solar panels inspection tools, etc.), projectors, lamps, holding tools or any other suitable tools.

Device 100 may include a housing 108. Housing 108 may be connected to or may be part of frame 105 (e.g., as shown in FIGS. 1F and 1G). Housing 108 may accommodate at least a portion of the tool connector 107. Housing 108 may releasably accommodate the tool connected to device 100 using tool connector 107.

Device 100 may include a base unit connector 109. Base unit connector 109 may be connected to or may be part of frame 105. Base unit connector 109 may connect device 100 to, for example, a base unit (e.g., a roof base unit 500 described hereinbelow), secure device 100 to the base unit and/or supply at least a power from the base unit to device 100.

Device 100 may include a first arm 110. First arm 110 may be connected to frame 105 and may rotate with respect to frame 105 about a first axis 112. In some embodiments, first arm 110 is connected at its first end 110a to frame 105. Device 100 may include a first actuator 114 to rotate first arm 110 about first axis 112.

Device 100 may include a second arm 120. Second arm 120 may be connected to frame 105 and may rotate with respect to frame 105 about a second axis 122. Second axis 122 may be parallel (or substantially parallel) to first axis 112. In some embodiments, second arm 120 is connected at its first end 120a to frame 105. Device 100 may include a second actuator 124 to rotate second arm 120 about second axis 122. In some embodiments, first arm 110 and second arm 120 are connected to opposite sides of frame 105 with respect to each other.

Device 100 may include a first vacuum suction cup 130. First vacuum suction cup 130 may be connected to first arm 110. In some embodiments, first vacuum suction cup 130 is connected to a second end 110b of first arm 110. First vacuum suction cup 130 may include one or more first cavities 134.

Device 100 may include a second vacuum suction cup 140. Second vacuum suction cup 140 may be connected to second arm 120. In some embodiments, second vacuum suction cup 140 is connected to a second end 120b of second arm 120. Second vacuum suction cup 140 may include one or more second cavities 144.

Device 100 may include a vacuum pump 146 to generate vacuum. Device 100 may include a first valve 147 to control generation of vacuum in and release of vacuum from first vacuum suction cup 130 (e.g. generation/release of vacuum in/from one or more first cavities 134 of first vacuum suction cup 130). Device 100 may include a second valve 148 to control generation of vacuum in release of vacuum from second vacuum suction cup 140 (e.g. generation/release of vacuum in/from one or more second cavities 144 of second vacuum suction cup 140). In some embodiments, device 100 includes a first vacuum pump to generate vacuum in first vacuum suction cup 130 and a second vacuum pump to generate vacuum in second vacuum suction cup 140 (not shown).

In some embodiments, first vacuum suction cup 130 and first arm 110 may rotate with respect to each other about a third axis 136 that is parallel (or substantially parallel) to first axis 112. Device 100 may include a third actuator 137 to rotate first vacuum suction cup 130 and first arm 110 with respect to each other about third axis 136. In some embodiments, second vacuum suction cup 140 and second arm 120 may rotate with respect to each other about a fourth axis 146 that is parallel (or substantially parallel) to second axis 122. Device 100 may include a fourth actuator 147 to rotate first vacuum suction cup 140 and second arm 120 with respect to each other about fourth axis 146.

In some embodiments, first vacuum suction cup 130 and first arm 110 may rotate with respect to each other about a fifth axis 138 that is perpendicular (or substantially perpendicular) to first axis 112. Device 100 may include a fifth actuator 139 to rotate first vacuum suction cup 130 and first arm 110 with respect to each other about fifth axis 138. In some embodiments, second vacuum suction cup 140 and second arm 120 may rotate with respect to each other about a sixth axis 148 that is perpendicular (or substantially perpendicular) to second axis 122. Device 100 may include a sixth actuator 149 to rotate second vacuum suction cup 140 and second arm 120 with respect to each other about sixth axis 148.

Device 100 may include a controller 150. Controller 150 may be connected to or disposed on frame 105. Controller 150 may control operation of vacuum pump 146, first and second valves 147, 148 and rotations of first and second arms 110, 120 and first and second vacuum suction cups 130, 140 to move device 100 on the vertical surface in a desired direction (e.g., as described hereinbelow with respect to FIGS. 2, 3 and 4).

Controller 150 may control rotation of first and second arms 110, 120 with respect to frame 105. Controller 150 may control rotation of first arm 110 and first vacuum suction cup 130 with respect to each other. Controller 150 may control rotation of second arm 120 and second vacuum suction cup 140 with respect to each other. Controller 150 may control actuators 114, 124, 137, 139, 147, 149 to cause rotation of respective components of device 100.

Controller 150 may control vacuum pump 146 to generate vacuum. Controller 150 may control first valve 147 to alternately generate and release vacuum in/from first vacuum suction cup 130 to alternately attach and detach first vacuum suction cup 130 to/from the vertical (or substantially vertical) surface. Controller 150 may control second valve 148 to alternately generate and release vacuum in/from one or more cavities 144 of second vacuum suction cup 140 to alternately attach and detach second vacuum suction cup 140 to/from the vertical (or substantially vertical) surface.

In some embodiments, device 100 includes one or more cameras 152. For example, device 100 may include an array of cameras 152. Camera(s) 152 may be connected to or disposed on frame 105 of device 100 (e.g. as shown in FIG. 1D). Controller 150 may control vacuum pump 146, first and second valves 147, 148, rotations of first and second arms 110, 120 and rotation of first and second vacuum suction cups 130, 140, based on images from camera(s) 152 to, for example, cause device 100 to move on the vertical (or substantially vertical) surface in a desired direction, to overcome obstacles and/or seek for portions of the vertical (or substantially vertical) surface that are appropriate for vacuum suction attachment.

In some embodiments, device 100 includes a first set of sensors 160 and a second set of sensors 162. For example, first set of sensors 160 may be disposed in first vacuum suction cup 130 (e.g. in one or more cavities 134 of first vacuum suction cup 130) and second set of sensors 162 may be disposed in second vacuum suction cup (e.g. in one or more cavities 144 of second vacuum suction cup 140). Each of first and second set of sensors 160, 162 may include distance sensors (e.g. such as ToF sensors) 160a, 162a, a pressure sensors 160c, 162c, an optical sensor 160e, 162e, or any other suitable sensors.

Controller 150 may, for example, determine, based on output signals from first and second sets of sensors 160, 162, whether or not portions of the vertical surface in front of first and second vacuum suction cups 130, 140, respectively, are appropriate for vacuum suction attachment (e.g., are sufficiently smooth) and/or contain obstacles (e.g., window frames, etc.) that may prevent attachment of first and second vacuum suction cups 130, 140, respectively, thereto. Controller 150 may control first and second valves 147, 148 and rotations of first and second arms 110, 120 and first and second vacuum suction cups 130, 140, based on output signals from first and second sets of sensors 160, 162 to, for example, overcome obstacles and/or seek for portions of the vertical surface that are appropriate for vacuum suction attachment.

In some embodiments, device 100 includes a communication unit 166. Communication unit 166 may be connected to or disposed on frame 105. In some embodiments, communication unit 166 is a wireless communication unit containing a modem and an antenna. Controller 150 may send and/or receive information using communication unit 166.

Figure 1H:
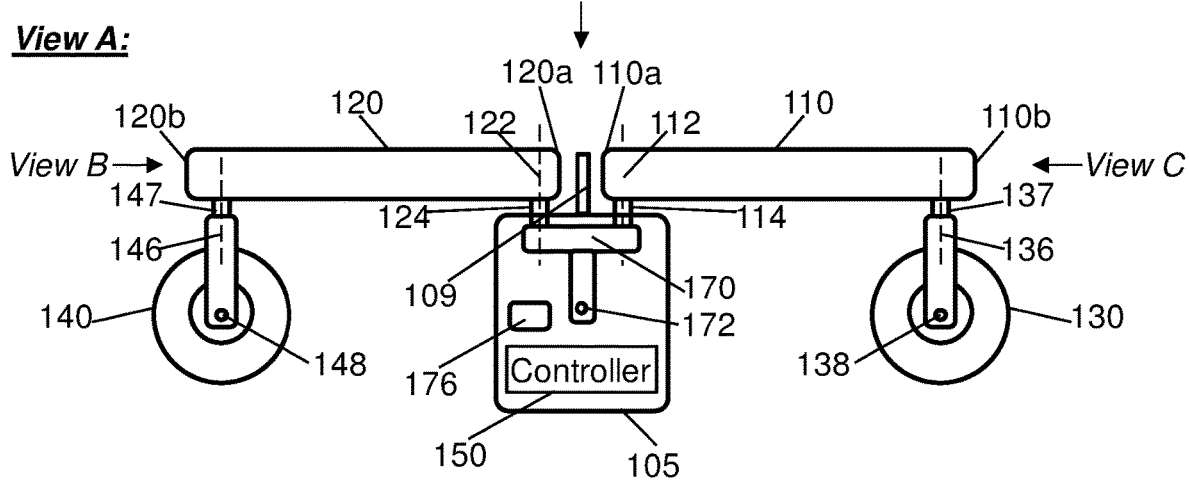
Figure 11:
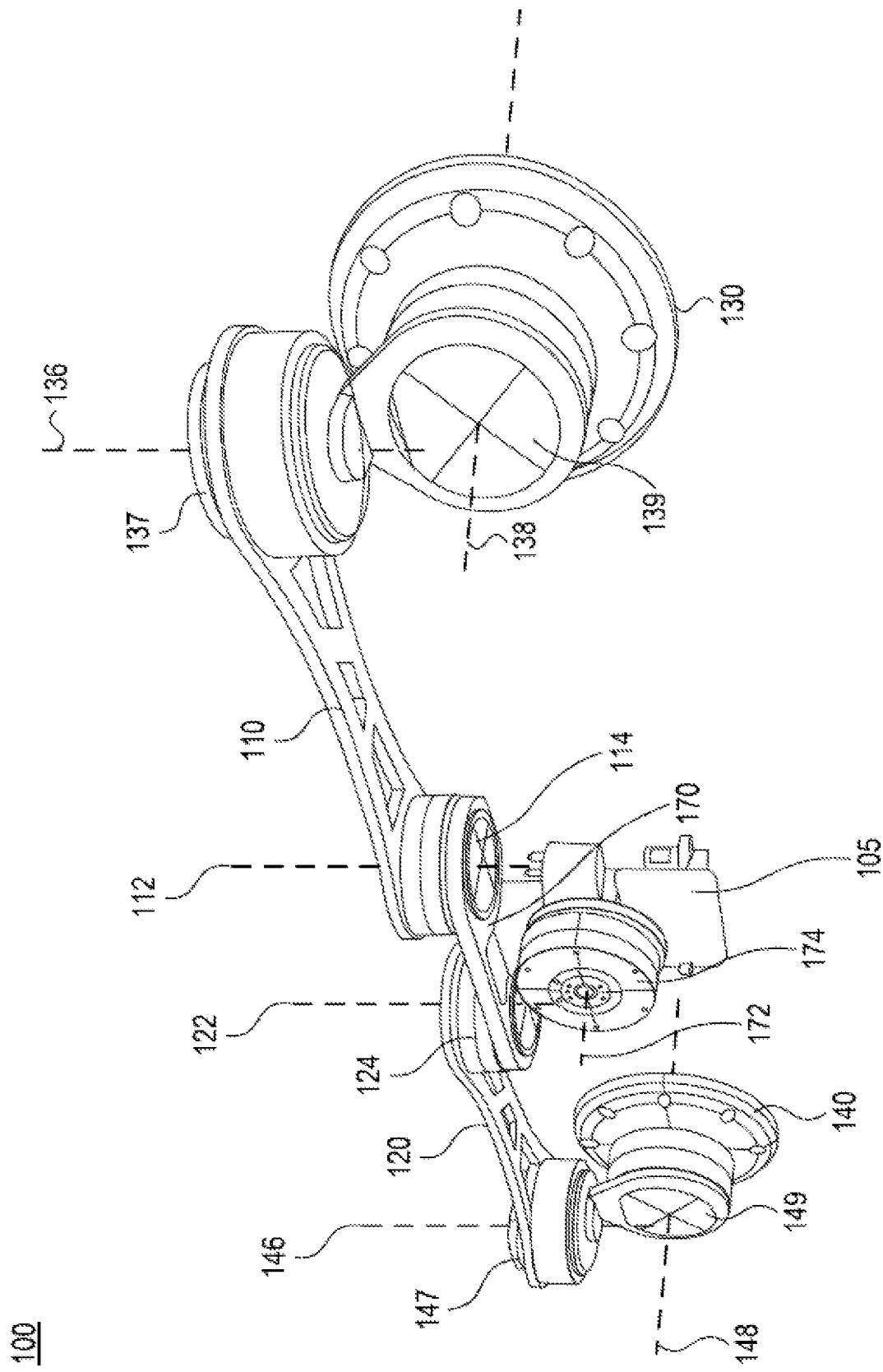
FIG. 11A is a 3D diagram of a system for cleaning vertical surfaces of buildings, according to some embodiments of the invention.
FIGS. 11B and 11C are 3D diagrams of the device for moving on the substantially vertical surface and the tool for cleaning vertical surface, according to some embodiments of the invention.

Reference is now made to FIGS. 1H and 1I, which are schematic illustration and 3D diagram, respectively, of device 100 for moving on the substantially vertical surface and including a sub-frame 170 for horizontal stabilization of a frame 105 thereof, according to some embodiments of the invention.

In some embodiments, device 100 includes a sub-frame 170 (e.g., as shown in FIGS. 1H and 1I). Sub-frame 170 may be connected to frame 105. Sub-frame 170 and frame 105 may rotate with respect to each other about a seventh axis 172 that is perpendicular (or substantially perpendicular) to first axis 112 and to second axis 122. Device 100 may include a seventh actuator 174 to rotate sub-frame 170 and frame 105 with respect to each other.

First arm 110 and second arm 120 may be connected to frame 105 via sub-frame 170. For example, first arm 110 may be connected (e.g., at its first end 110a) to sub-frame 170 and may rotate with respect to sub-frame 170 about first axis 112. Yet in this example, second arm 120 may be connected (e.g., at its first end 120a) to sub-frame 170 and may rotate with respect to sub-frame 170 about second axis 122.

In some embodiments, device 100 includes a third set of sensors 176 (e.g., as shown in FIG. 1F). Third set of sensors 176 may be connected to or disposed on frame 105. Third set of sensors 176 may include inertial sensors such as one or more accelerometer sensors, one or more gyro sensors, or any other suitable sensors. When device 100 is attached to or disposed on the vertical surface by first and/or second vacuum suction cups 130, 140, controller 150 may control rotation of frame 105 with respect to sub-frame 170 based on at least one of output signals from third set of sensors 176, output signals from encoders of actuators 114, 124, 137, 139, 147, 149 and/or images from camera(s) 152 to maintain a horizontal (or substantially horizontal) orientation of frame 105 in real-world coordinates. For example, illustrations 100c-1 to 100c-4 in FIG. 4B schematically movement of device 100 having sub-frame 170 on vertical surface 90 in a vertical direction 402.

In some embodiments, device 100 includes a fourth set of sensors 165. Based on output signals from fourth set of sensors 165 and/or camera(s) 152, controller 165 may control components of device 100 to move and navigate device 100 on the substantially vertical surface (e.g. as described herein). Fourth set of sensors 165 may include one or more barometers, one or more global navigation satellite system (GNSS) sensors (e.g. global positioning system (GPS) sensors) or any other suitable sensors that may be used for navigating device 100 on the substantially vertical surface. Fourth set of sensors 165 may be connected to or disposed on, e.g. frame 105 of device 100 (e.g. as shown in FIG. 1D). Controller 150 may control components of device 100 to move and navigate device 100 on the vertical (or substantially vertical) surface based on output signals from at least one of: first set of sensors 160, second set of sensors 162, camera(s) 152, third set of sensors 176, fourth set of sensors 165 and/or encoders of actuators 114, 124, 137, 139, 147, 149 (e.g. as described herein).

Figure 2:
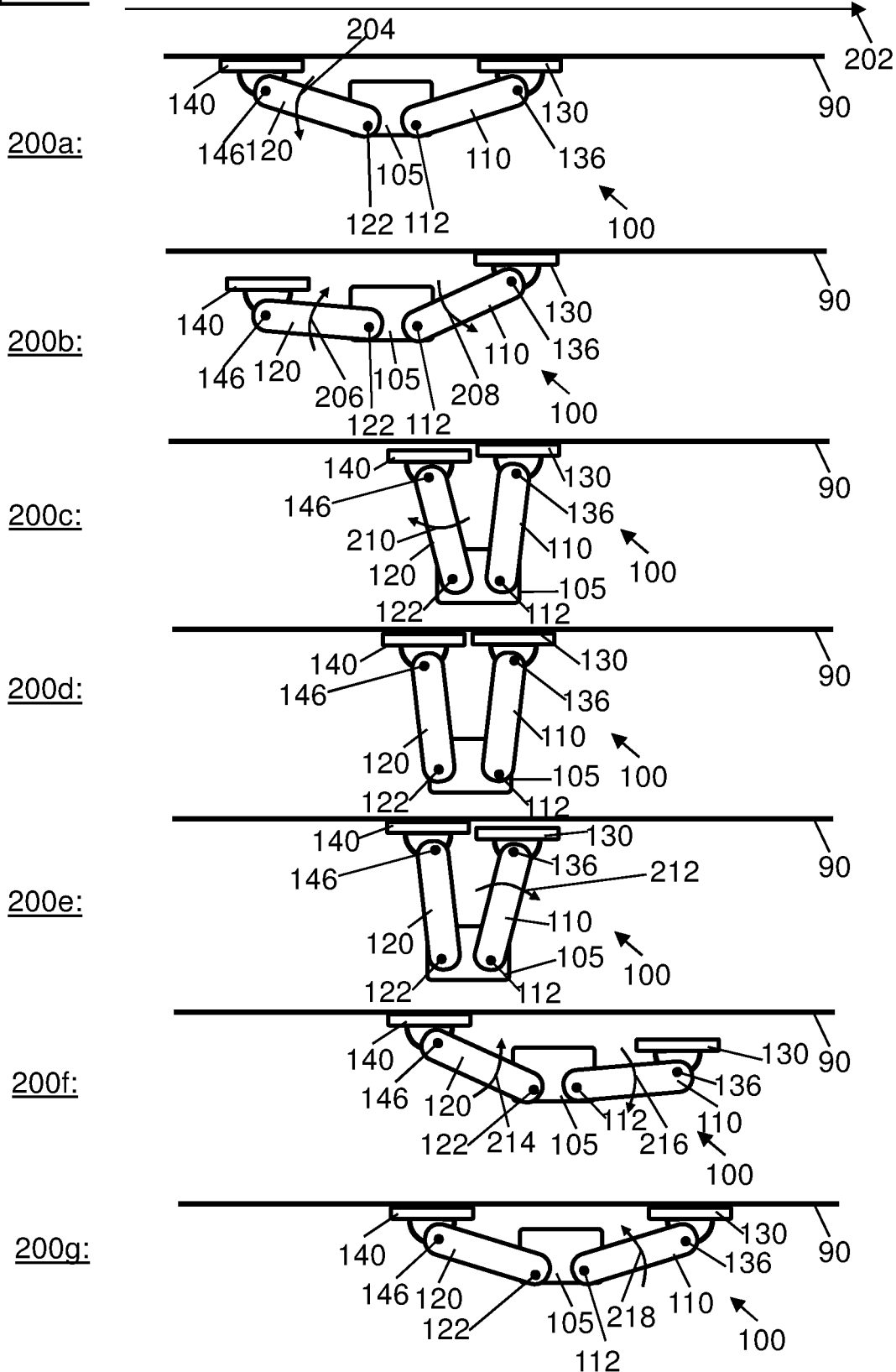
FIG. 2 shows schematic illustrations of horizontal movement of the device during operation on the vertical surface, according to some embodiments of the invention.

Reference is now made to FIG. 2, which shows schematic illustrations of horizontal movement of device 100 during operation on vertical surface 90, according to some embodiments of the invention.

Illustrations 200a to 200g schematically show a top view of vertical surface 90 and device 100. Illustrations 200a to 200g in FIG. 2 schematically show movement of device 100 in a horizontal direction 202 on vertical surface 90.

In illustration 200a, device 100 is attached to vertical surface 90 by first and second vacuum suction cups 130, 140 due to operation of vacuum pump 146 and first and second valves 147, 148, respectively. Vacuum pump 146, first and second valves 147, 148 and controller 150 are not shown in FIG. 2 for sake of clarity. At this stage, device 100 is stationary. In order to detach second vacuum suction cup 140 from vertical surface 90, controller 150 may control second valve 148 to release pressure from one or more cavities 144 of second vacuum suction cup 140 and rotate second arm 120 with respect to frame 105 about second axis 122 in a first direction as indicated by arrow 204 in illustration 200a. At this stage, device 100 is attached to vertical surface 90 by first vacuum suction cup 130 due to operation of vacuum pump 146 and of first valve 147.

Controller 150 may further rotate first arm 110 (being attached to vertical surface 90) with respect to first vacuum suction cup 130 about third axis 136 in a first direction indicated by arrow 206 in illustration 200b and rotate second arm 120 with respect to frame 105 in a second direction indicated by arrow 208 in illustration 200b to move second vacuum suction cup 140 adjacent (or substantially adjacent) to first vacuum suction cup 130 in horizontal direction 202.

Controller 150 may further determine, e.g. based on output signals from second set of sensors 162 and/or camera(s) 152, whether or not a portion of vertical surface 90 in front of second vacuum suction cup 140 is appropriate for vacuum suction attachment or contains obstacles (e.g., as described above with respect to FIGS. 1A, 1B, 1C, 1D and 1E). Second set of sensors 162 and camera(s) 152 are not shown in FIG. 2 for sake of clarity. If controller 150 determines that the portion of vertical surface 90 is not appropriate for vacuum suction attachment or contains obstacles, controller 150 may rotate second arm 120 with respect to frame 105 and/or with respect to second vacuum suction cup 140 and/or rotate first arm 110 with respect to frame 105 and/or with respect to first vacuum suction cup 130 to change the location of second vacuum suction cup 140 with respect to vertical surface 90 to seek for another portion of vertical surface 90 that is appropriate for vacuum suction attachment or contains no obstacles. Upon determination that the portion of vertical surface 90 in front of second vacuum suction cup 140 is appropriate for vacuum suction attachment and contains no obstacles, controller 150 may rotate second arm 120 in a second direction as indicated by arrow 210 in illustration 200c to bring second vacuum suction cup 140 in contact with vertical surface 90. Controller 150 may further control second valve 148 to generate vacuum in second vacuum suction cup 140 to attach second vacuum suction cup 140 to vertical surface 90. At this stage, as show in illustration 200d, device 100 is attached to vertical surface 90 by first and second vacuum suction cups 130, 140 due to operation of vacuum pump 146 and of first and second valves 147, 148, respectively.

In order to detach first vacuum suction cup 132 from vertical surface 90, controller 150 may control first valve 147 to release vacuum from first vacuum suction cup 130 and rotate first arm 110 with respect to frame 105 about first axis 112 in the second direction as indicated by arrow 212 in illustration 200e. At this stage, device 100 is attached to vertical surface 90 by second vacuum suction cup 140 due to operation of vacuum pump 146 and of first valve 147.

Controller 150 may further rotate second arm 120 with respect to second vacuum suction cup 140 (being attached to vertical surface 90) in the first direction as indicated by arrow 214 in illustration 200f and rotate first arm 110 in the second direction as indicated by arrow 216 in illustration 200f to move first vacuum suction cup 130 away from second vacuum suction cup 140 in horizontal direction 202.

Controller 150 may further determine, e.g. based on output signals from first set of sensors 160 and/or camera(s) 152, whether or not a portion of vertical surface 90 in front of first vacuum suction cup 130 is appropriate for vacuum suction attachment or contains obstacles. First set of sensors 160 is not shown in FIG. 2 for sake of clarity. Upon determination that the portion of vertical surface 90 in front of first vacuum suction cup 130 is appropriate for vacuum suction attachment, controller 150 may rotate first arm 110 in the first direction as indicated by arrow 218 in illustration 200g to bring first vacuum suction cup 130 in contact with vertical surface 90. Controller 150 may further control first valve 147 to generate vacuum in first vacuum suction cup 130 to attach first vacuum suction cup 130 to vertical surface 90. At this stage, device 100 is attached to vertical surface 90 by first and second vacuum suction cups 130, 140 due to operation of vacuum pump 146 and of first and second vacuum pumps 147, 148, respectively.

It is noted that FIG. 2 illustrates an example of a single movement cycle of device 100 on vertical surface 90 in a horizontal direction. It is further noted that during horizontal motion device 100 may not necessarily need to move through each stage, or in exactly the same order as illustrated and described in FIG. 2.

Figure 3:
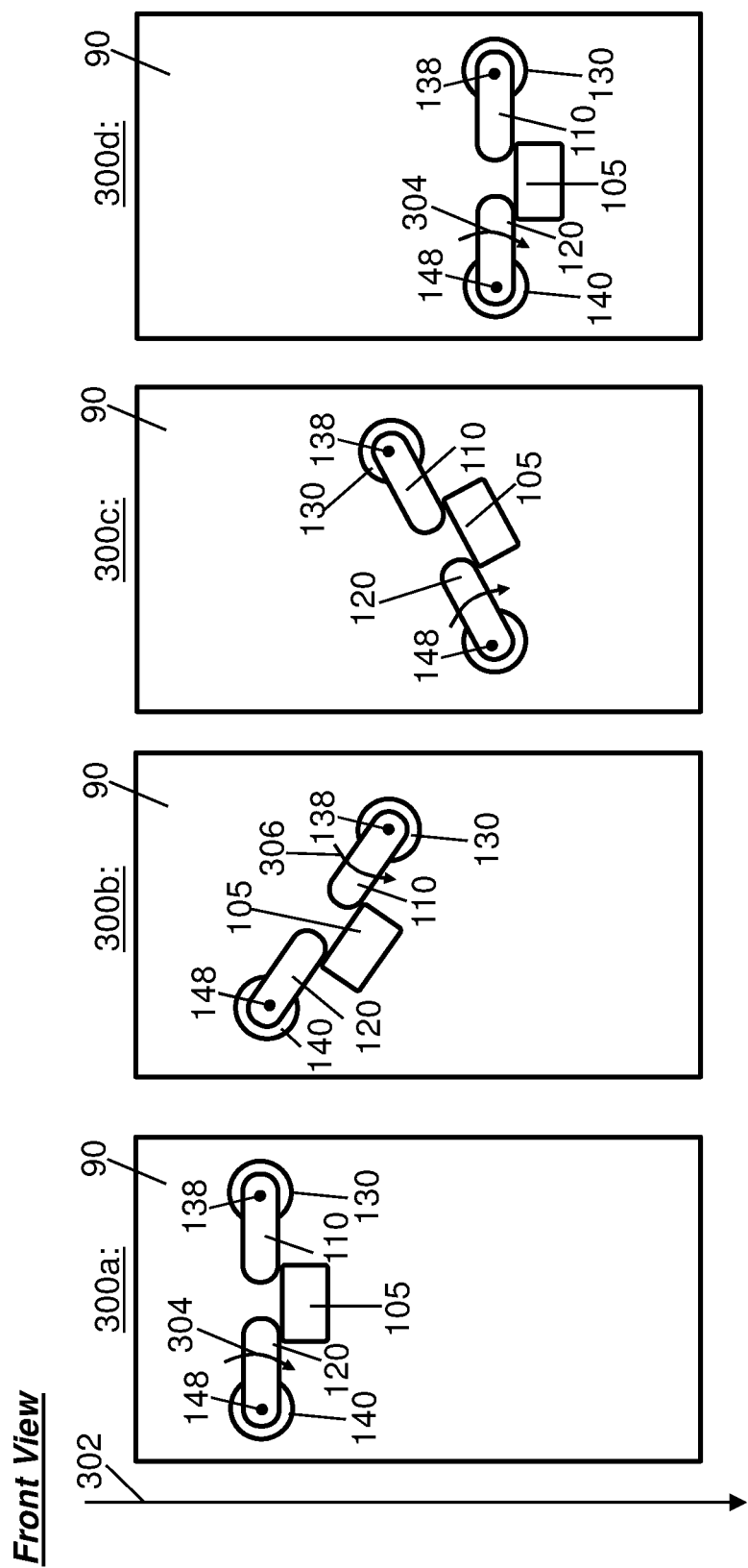
FIG. 3 shows schematic illustrations of vertical movement of the device during operation on the vertical surface, according to some embodiments of the invention.

Reference is now made to FIG. 3, which shows schematic illustrations of vertical movement of device 100 during operation on vertical surface 90, according to some embodiments of the invention.

Illustrations 300a to 300d in FIG. 3 schematically show a front view of vertical surface 90 and device 100. Illustrations 300a to 300d in FIG. 3 schematically show movement of device 100 in a vertical direction 302 on vertical surface 90.

In illustration 300a, device 100 is attached to vertical surface 90 by first and second vacuum suction cups 130, 140 due to operation of vacuum pump 146 and first and second valves 147, 148, respectively. At this stage device 100 is a horizontal (or substantially horizontal). Vacuum pump 146, first and second valves 147, 148 and controller 150 are not shown in FIG. 3 for sake of clarity. In order to detach first vacuum suction cup 130 from vertical surface 90, controller 150 may control first valve 147 to release vacuum from first vacuum suction cup 130 and rotate second arm 120 with respect to second vacuum suction cup 140 about sixth 148, for example in a first direction as indicated by arrow 304 in illustration 300a. At this stage, device 100 is attached to vertical surface 90 by second vacuum suction cup 140 due to operation of vacuum pump 146 and of second valve 148.

Controller 150 may further determine, based on output signals from first set of sensors 160 and/or camera(s) 152, whether or not a portion of vertical surface 90 in front of first vacuum suction cup 130 is appropriate for vacuum suction attachment or contains obstacles. First set of sensors 160 is not shown in FIG. 3 for sake of clarity. Upon determination that the portion of vertical surface 90 in front of first vacuum suction cup 130 is appropriate for vacuum suction attachment and contains no obstacles, controller 150 may control first valve 147 to generate vacuum in first vacuum suction cup 130 to attach first vacuum suction cup 130 to vertical surface 90. At this stage, device 100 is attached to vertical surface 90 by first and second vacuum suction cups 130 due to operation of vacuum pump 146 and of first and second valves 147, 148, respectively.

In order to detach second vacuum suction cup 140 from vertical surface 90, controller 150 may control second valve 148 to release vacuum from second vacuum suction cup 140 and rotate first arm 110 with respect to first vacuum suction cup 130 (being attached to vertical surface 90) about fifth axis 138 in a second direction as indicated by arrow 306 in illustration 300b. At this stage, device 100 is attached to vertical surface 90 by first vacuum suction cup 130 due to operation of vacuum pump 146 and of first valve 147. Upon determination that a portion of vertical surface 90 in second of second vacuum suction cup 140 is appropriate for vacuum suction attachment and contains no obstacles, controller 150 may control second valve 148 to generate vacuum in second vacuum suction cup 140 to attach second vacuum suction cup 140 to vertical surface 90. At this stage, device 100 is attached to vertical surface 90 by first and second vacuum suction cups 130, 140 due to operation of vacuum pump 146 and of first and second valves 147, 148, respectively.

In order to detach first vacuum suction cup 130 from vertical surface 90, controller 150 may control first valve 147 and rotate second arm 120 with respect to second vacuum suction cup 140 (e.g., being attached to vertical surface 90) in the first direction as indicated by arrow 308 in illustration 300c. At this stage, device 100 is attached to vertical surface 90 by second vacuum suction cup 140 due to operation of vacuum pump 146 and of second valve 148. Upon determination that a portion of vertical surface 90 in second of first vacuum suction cup 130 is appropriate for vacuum suction attachment and contains no obstacles, controller 150 may control first valve 147 to generate vacuum in first vacuum suction cup 130 to attach first vacuum suction cup 130 to vertical surface 90. At this stage, device 100 is attached to vertical surface 90 by first and second vacuum suction cups 130, 140 of device due to operation of vacuum pump 146 and of first and second valves 147, 148, respectively. At this stage device 100 is horizontal (or substantially horizontal).

It is noted that FIG. 3 illustrates an example of a single movement cycle of device 100 on vertical surface 90 in one vertical direction. It is further noted that during vertical motion device 100 may not necessarily need to move through each stage, or in exactly the same order as illustrated and described in FIG. 3. It is further noted that device 100 may simultaneously move in both vertical and horizontal directions.

Figure 4:
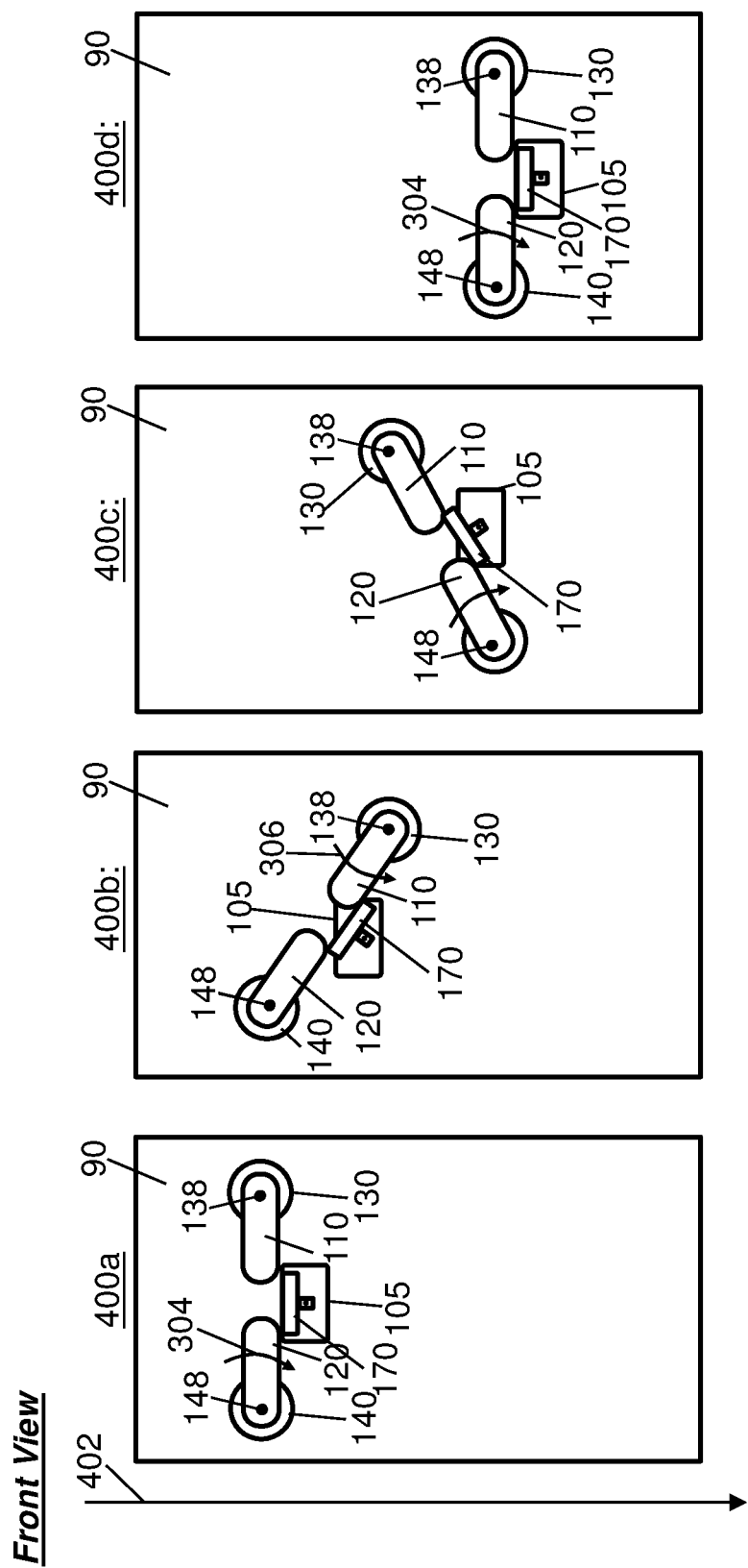
FIG. 4 shows schematic illustrations of vertical movement of the device during operation on the vertical surface, the device including a sub-frame for horizontal stabilization of a frame thereof, according to some embodiments of the invention.

Reference is also made to FIG. 4, which shows schematic illustrations of vertical movement of device 100 including sub-frame 170 for horizontal stabilization of frame 105 thereof during operation on vertical surface 90, according to some embodiments of the invention.

Illustrations 400a to 400d in FIG. 4 show a front view of vertical surface 90 and device 100. Illustrations 400a to 400d in FIG. 4 schematically show movement of device 100 including sub-frame 170 in a vertical direction 402 on vertical surface 90. As shown in FIG. 4, frame 105 of device 100 remains horizontal during vertical movement of device 100.

Figure 5A:
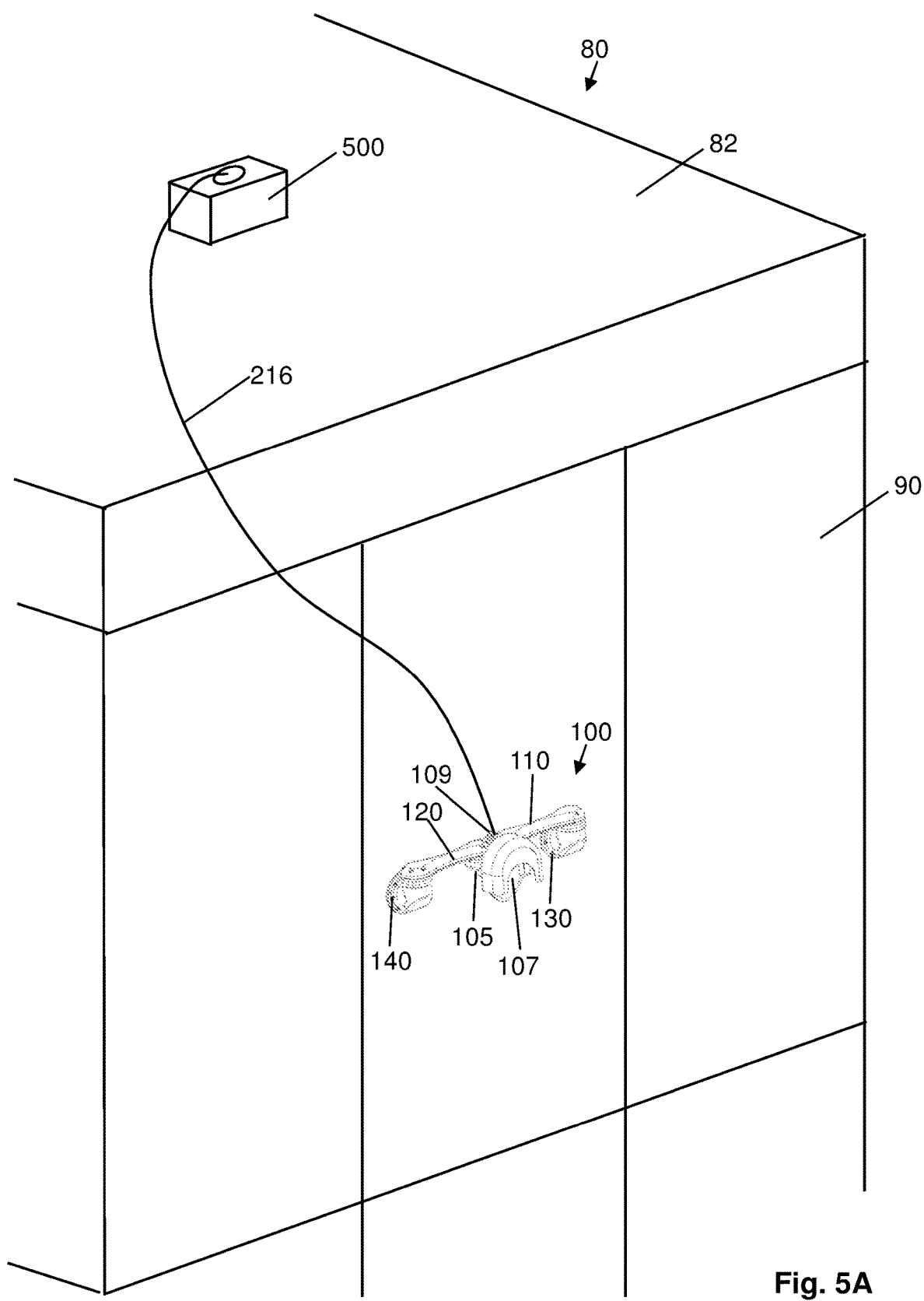
FIG. 5A is a schematic illustration of a base unit, the device for moving on vertical surfaces, and a building having a substantially vertical surface, according to some embodiments of the invention.

Reference is now made to FIG. 5A, which is a schematic illustration of a base unit 500, device 100 for moving on vertical surfaces, and a building 80 having a vertical surface 90, according to some embodiments of the invention.

Figure 5B:
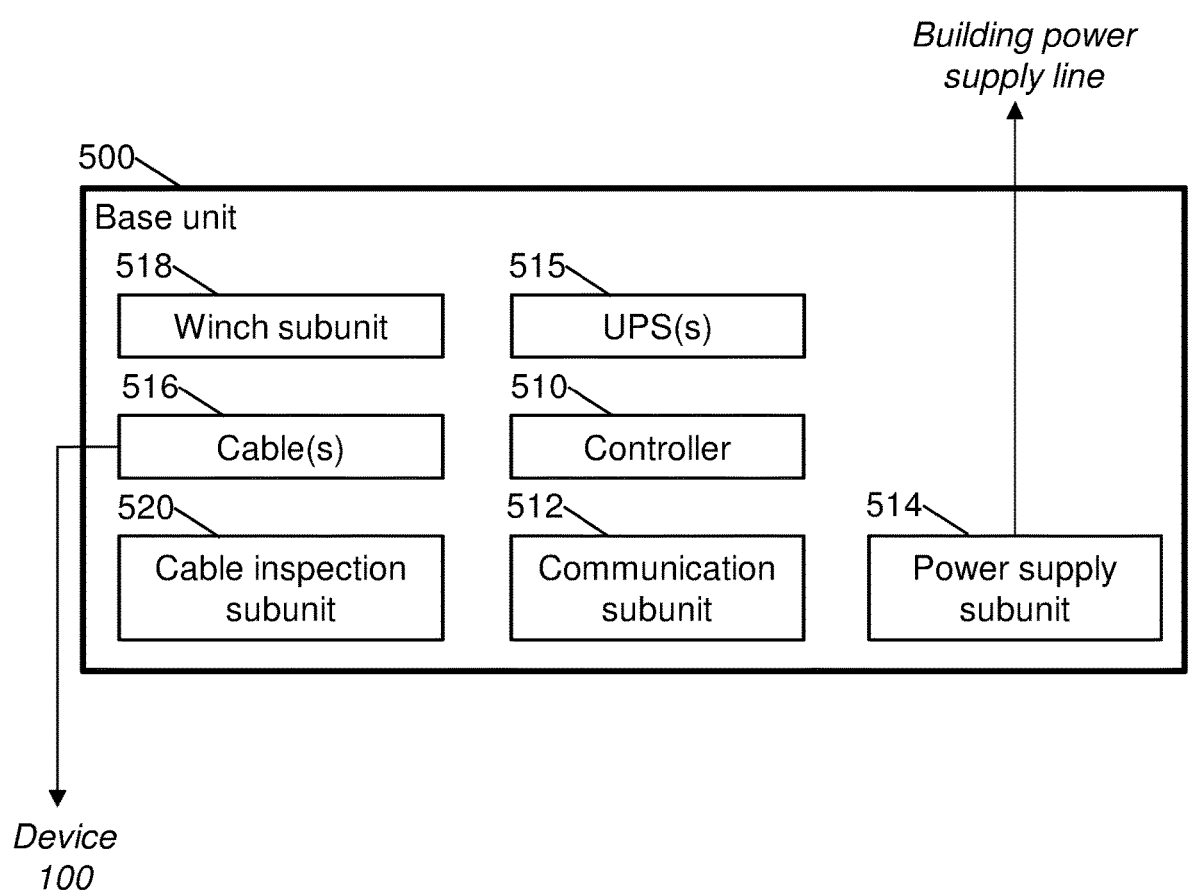
FIG. 5B is a block diagram of the base unit, according to some embodiments of the invention.

Reference is also made to FIG. 5B, which is a block diagram of base unit 500, according to some embodiments of the invention.

Figure 5C:
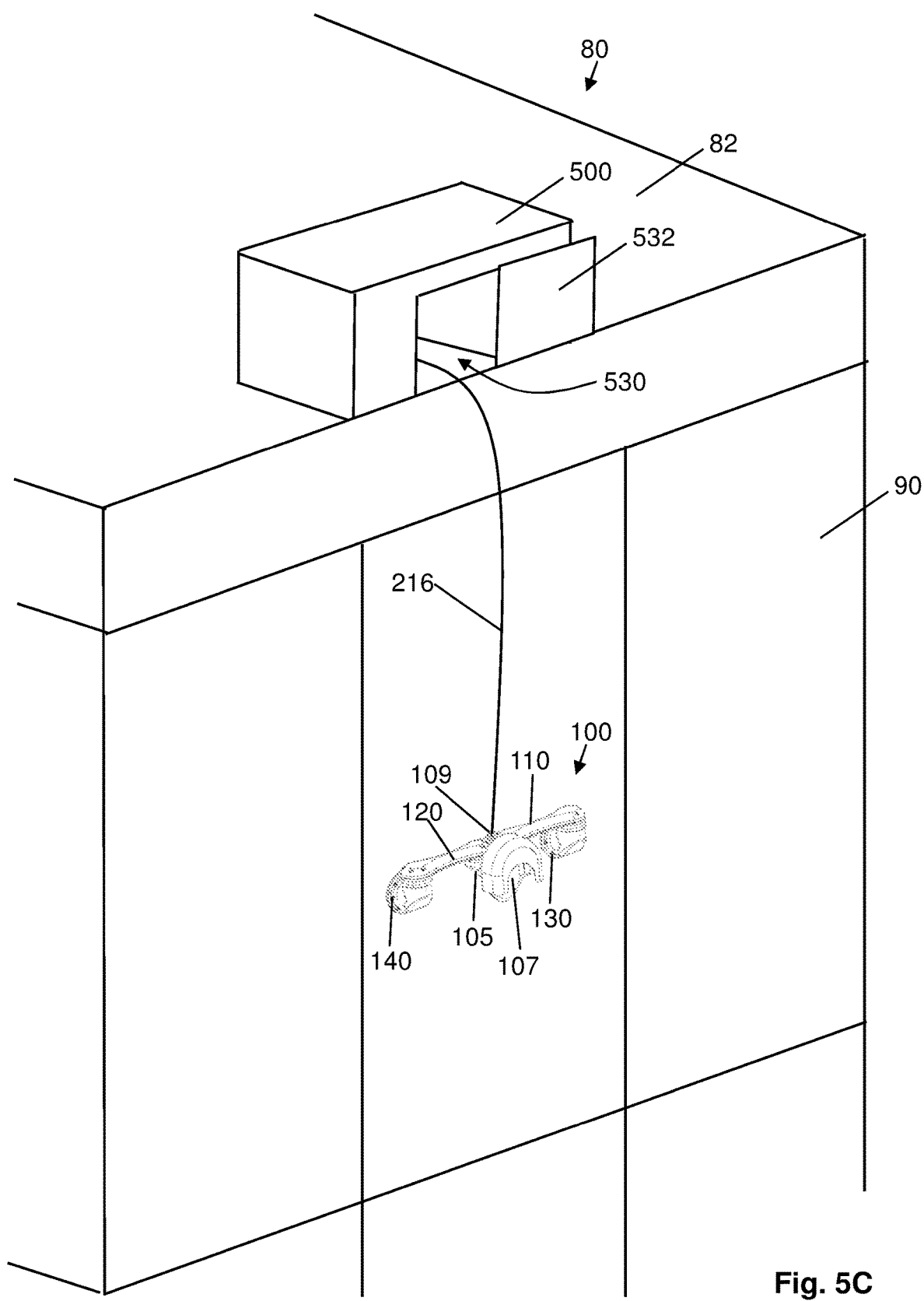
FIG. 5C is a block diagram of base unit having a compartment to accommodate the device for moving on vertical surfaces, according to some embodiments of the invention.

Reference is also made to FIG. 5C, which is a block diagram of base unit 500 having a compartment 530 to accommodate device 100 device for moving on vertical surfaces, according to some embodiments of the invention.

Some embodiments of the present invention may provide a base unit 500. Base unit 500 may be mounted on top of vertical surface 90, for example on a roof 82 of a building 80. Base unit 500 may connect device 100 moving on vertical (or substantially vertical) surface 90, secure device 100 and provide at least a power to device 100. For example, base unit 500 may be permanently mounted on roof 82. In another example, base unit 500 may be removably mounted on roof 82.

In some embodiments, base unit 500 includes a controller 510 to control components of base unit 500.

In some embodiments, base unit 500 includes a communication subunit 512 to send and receive information. For example, communication subunit 512 may send information to and receive information from device 100. In some embodiments, communication subunit 512 is wireless communication subunit containing a modem and an antenna.

In some embodiments, base unit 500 includes a power supply subunit 514. Power supply subunit 514 may be connected to a power supply line of building 80. In some embodiments, base unit 500 includes one or more uninterruptible power supply (UPS) subunits 515 to supply power in the case of failure in the power supply line of building 80.

In some embodiments, base unit 500 includes a cable 516. Cable 516 may be connected at its first end to base unit 500 and at its second end to tool connector 109 of device 100. Cable 516 may secure device 100 to base unit 500 (and thus to roof 82 of building 80). For example, in the case of unintended detachment of device 100 from vertical surface 90 of building 80, cable 516 may prevent device 100 from falling onto the ground. In some embodiments, cable 516 supplies at least a power to device 100 from power supply subunit 514 and/or from UPS subunit(s) 515 of base unit 500. In some embodiments, cable 516 supplies a communication channel to device 100. In some embodiments, cable 516 is a tethered cable. In some embodiments, base unit 500 includes different cables for securing device 100 and for supplying power to device 100.

In some embodiments, base unit 500 includes a winch subunit 518. Winch subunit 518 may alternately wind and unwind cable 516. In some embodiments, base unit 500 includes a cable inspection subunit 520. Cable inspection subunit 520 may be disposed adjacent to winch subunit 518 and may inspect cable 516 during winding up and/or winding down of cable 516 by winch subunit 518. For example, cable inspection subunit 520 may include a camera to acquire images of cable 516 during winding and/or unwinding thereof and send the images to controller 510. Controller 510 may determine, based on the images, whether or not cable 516 includes one or more damaged sections. Upon determination of the one or more damaged sections in cable 516, controller 510 may cause communication subunit 512 to send to one or more authorized parties one or more respective notifications.

In some embodiments, controller 150 of device 100 controls components of base unit 500. For example, controller 150 of device 100 may send, using its communication unit 166, a command to communication subunit 512 of base unit 500 to wind or unwind cable 516. Upon receipt of the command by communication subunit 512, controller 510 of base unit 500 may control winch subunit 518 accordingly. Controller 150 and communication unit 166 of device 100 are not shown in FIGS. 5A and 5B for sake of clarity.

In some embodiments, base unit 500 includes a compartment 530 to accommodate device 100 (e.g. as shown in FIG. 5C). In the example of FIG. 5C, based unit 500 is positioned adjacent to the edge of roof 82 to let device 100 go into and out of compartment 530. When device 100 is not in use, device 100 may be accommodated within compartment 530 of base unit 530. Controller 150 of device 100 may, for example, control components of device 100 and/or of base unit 500 to cause device 100 to get out from compartment 530 or get in to compartment 530 of base unit 500. Base unit 500 may include a door 532 to close and open compartment 530.

Some embodiments of the present invention may provide a tool for cleaning a vertical (or substantially vertical) surface, for example tools 600, 900 and 100 described hereinbelow. The tool may include a body, one or more brushes rotatably connected to or disposed on the body and one or more propellers connected to or disposed on the body. At least one of the one or more propellers may generate thrust to push the tool against the vertical surface. At least one of the one or more propellers may generate thrust to push the tool away from the vertical surface. At least one of the one or more propellers may generate thrust to maintain a desired vertical orientation of the tool and/or stabilize the tool with respect to the vertical surface. In operation on the vertical (or substantially) surface, the tool may be pushed against the vertical (or substantially vertical) surface by thrust generated by at least one of the one or more propellers and may be simultaneously moved in a vertical direction along the vertical (or substantially vertical) surface to clean the vertical (or substantially vertical) surface by the brush(es) thereof. The tool may overcome obstacles on the vertical (or substantially vertical) surface.

Figure 6A:
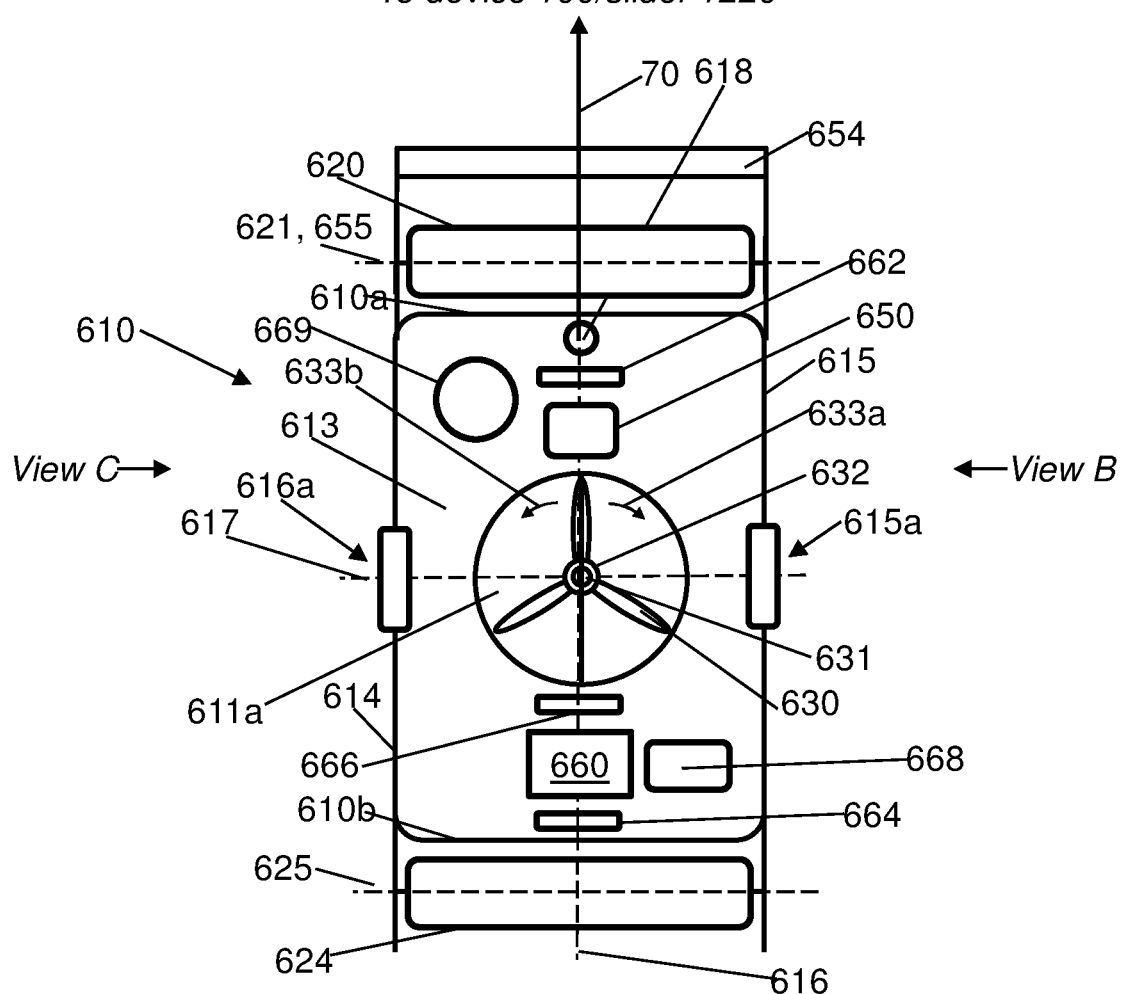
FIGS. 6A, 6B and 6C are schematic illustrations of a vertical surface cleaning tool including a propeller disposed within an opening formed between front and rear surfaces of a body of the tool and two opposing propellers disposed on opposing lateral body surfaces of the tool, according to some embodiment of the invention.
Figures 6B, 6C:
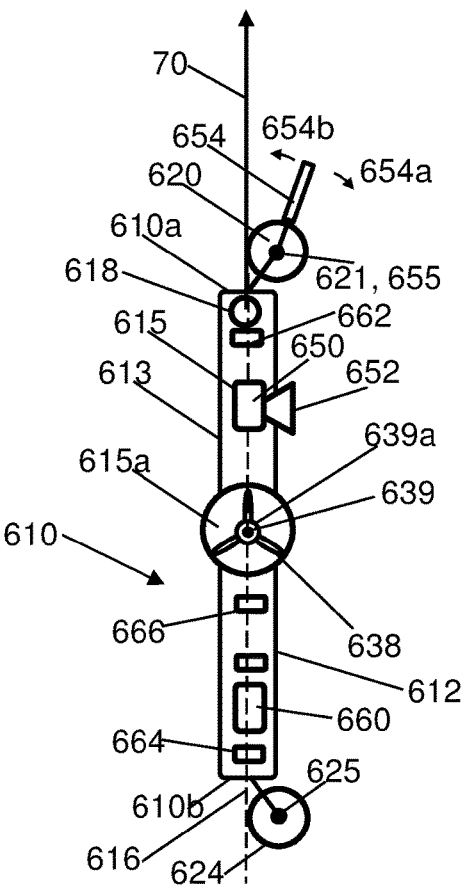

Reference is now made to FIGS. 6A, 6B and 6C, which are schematic illustrations of a vertical surface cleaning tool 600 including a propeller 630 disposed within an opening formed between front and rear surfaces 612, 613 of a body 610 of tool 600 and two opposing propellers 635, 638 disposed on opposing lateral body surfaces 614, 615 of vertical surface cleaning tool 600, according to some embodiment of the invention.

Figure 6D:
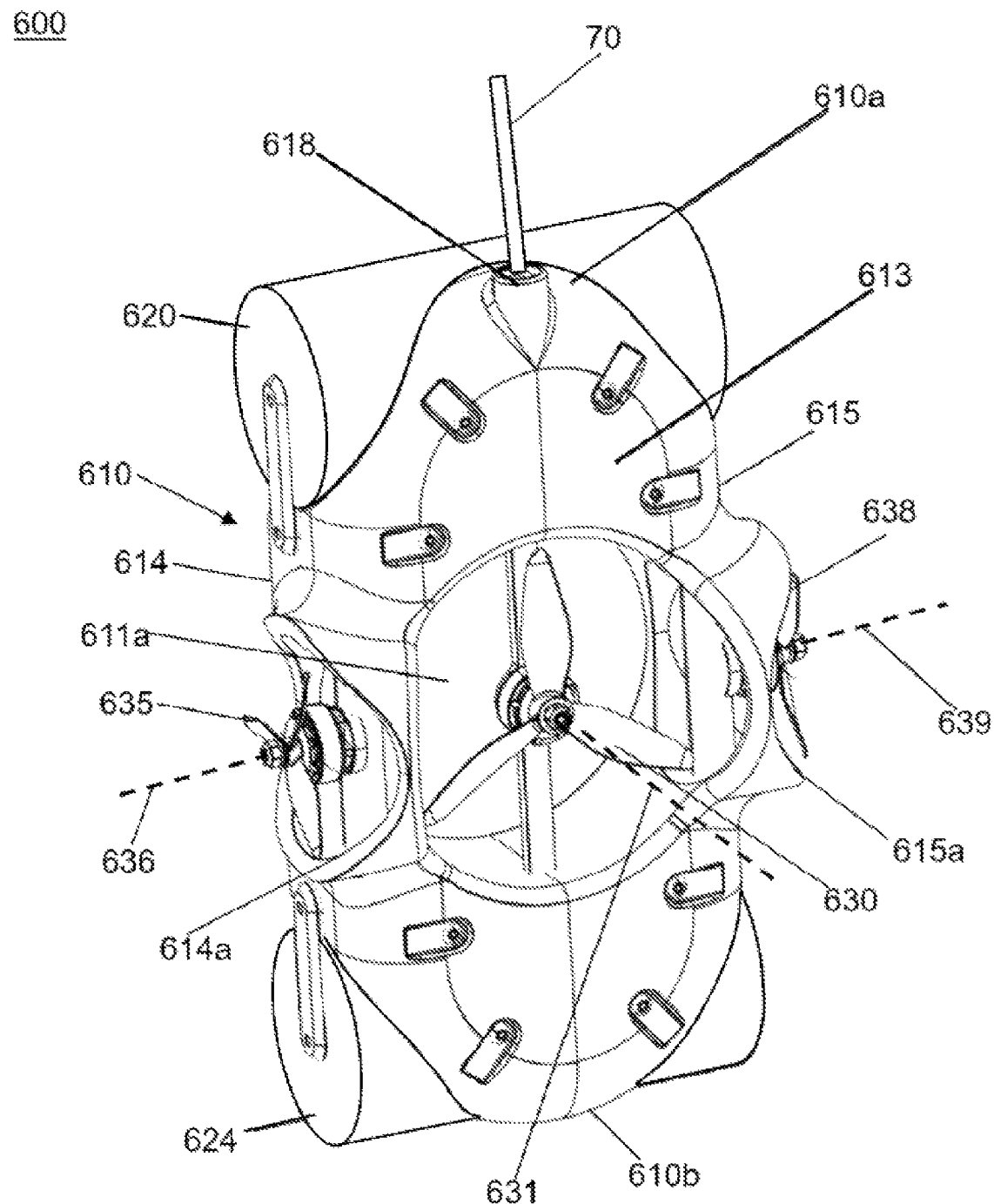
FIG. 6D is a 3D diagram of the vertical surface cleaning tool of FIGS. 6A, 6B and 6C, according to some embodiment of the invention.

Reference is now made to FIG. 6D, which is a 3D diagram of vertical surface cleaning tool 600 of FIGS. 6A, 6B and 6C, according to some embodiment of the invention.

Tool 600 may clean vertical (or substantially vertical) surfaces, such as for example walls and/or windows of buildings.

Tool 600 may include a body 610. Body 610 may include a first body end 610a, a second body end 610b, a front body surface 612 (facing the vertical surface when tool 600 is in operation) and a rear body surface 613 (facing away from the vertical surface when tool 600 is in operation), a first longitudinal lateral body surface 614 and a second longitudinal lateral body surface 615. At least front body surface 612 (facing the vertical surface when tool 600 is in operation) may be flat (or substantially flat). Rear body surface 613 (facing away from the vertical surface when tool 600 is in operation) may be flat (or substantially flat). Body 610 may be flat (or substantially flat). Body 610 may include a central longitudinal body axis 616 extending between first and second body ends 610a, 610b. Body 610 may include a central transverse body axis 617 extending between first and second longitudinal lateral body surfaces 614, 615. Central transverse body axis 617 may be perpendicular to central longitudinal body axis 616.

Tool 600 may include a cable connector 618 to connect body 610 to a cable 70. Cable connector 618 may be disposed at, for example, first body end 610a of body 610. Cable 70 may be connected to, for example, a device that can move on the vertical surface (e.g., device 100 described hereinabove) or a slider movable on rails mounted on a roof a building (e.g., slider 1220 described below with respect to FIG. 1010a). Cable 70 may be alternately winded or winded to adjust a vertical position of tool 600 along the vertical surface. In various embodiments, device 100 or slider 1220 controls the winding and unwinding of cable 70.

Tool 600 may include one or two brushes. Each of the brush(es) may be connected to one of first and second body ends 610a, 610b. The brush(es) may clean vertical surfaces. For example, the brush(es) may clean dust from vertical surfaces. In some embodiments, tool 600 includes a first brush 620 connected to first body end 610a. In some embodiments, first brush 620 may rotate with respect to body 610 about a first brush rotation axis 621 that is perpendicular (or substantially perpendicular) to central longitudinal body axis 616. In some embodiments, device 100 includes a second brush 624 connected to second end 610b of body 610. In some embodiments, second brush 624 may rotate with respect to body 610 about a second brush rotation axis 625 that is perpendicular (or substantially perpendicular) to central longitudinal body axis 616.

Figure 7:
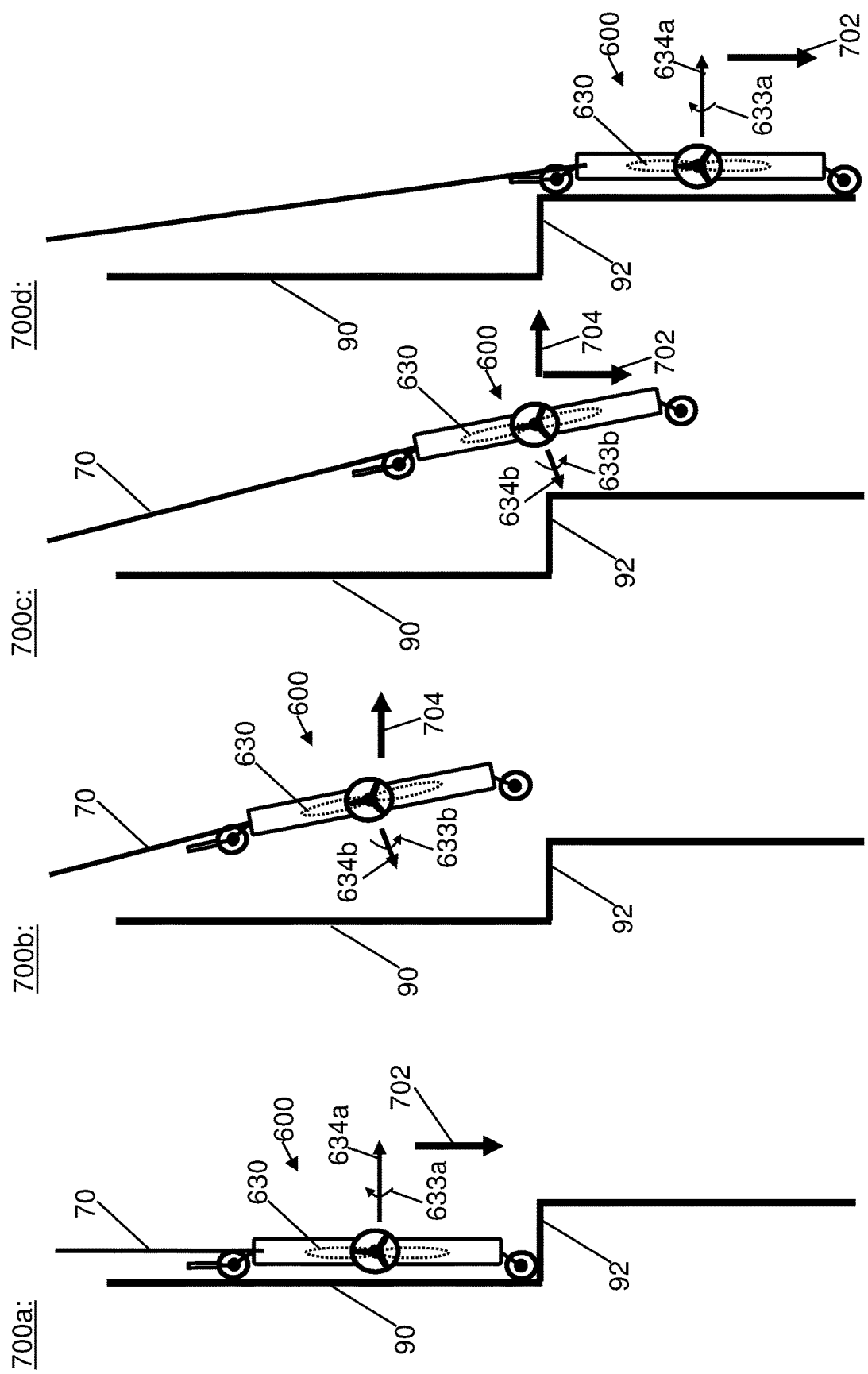
FIG. 7 shows schematic illustrations of the vertical surface cleaning tool overcoming an obstacle during operation on a vertical surface, according to some embodiments of the invention.

Tool 600 may include a first propeller 630. First propeller 430 may be connected to or disposed on body 610. First propeller 630 may be connected or disposed within a first opening or bore 611a formed in body 610 between front and read body surfaces 612, 613. First propeller 630 may rotate about a first propeller rotation axis 631 that is perpendicular (or substantially perpendicular) to central longitudinal body axis 616 and to central transverse body axis 617. Tool 600 may include a first motor 632 to rotate first propeller 630. First propeller 630 may rotate in a first direction 633a (e.g., as shown in FIG. 6A) to generate thrust in a first direction 634a (e.g., as shown in FIG. 7) to push tool 600 against the vertical (or substantially vertical) surface. First propeller 630 may rotate in a second direction 633b (e.g., as shown in FIG. 6A) to generate a thrust in a second direction 634b (e.g., as shown in FIG. 7) to push tool 600 away from the vertical (or substantially vertical) surface.

Tool 600 may include two opposing propellers connected to or disposed on first and second longitudinal lateral body surfaces 614, 615. Opposing propellers 614, 615 may generate thrust in directions perpendicular to first and second longitudinal lateral body surfaces 614, 615, e.g., to maintain a desired vertical orientation of tool 600 and/or to stabilize tool 600 with respect to the vertical (or substantially vertical) surface. In the example of FIGS. 6A-6D, tool 600 includes a second propeller 635 connected to or disposed on first longitudinal lateral body surface 614 and rotatable about a second propeller axis 636 that is perpendicular (or substantially perpendicular) to first longitudinal lateral body surface 614 to generate thrust in a direction perpendicular to first longitudinal lateral body surface 614. In the same example of FIGS. 6A-6D, tool 600 includes a third propeller 638 connected to or disposed on second longitudinal lateral body surface 615 and rotatable about a third propeller axis 639 that is perpendicular (or substantially perpendicular) to second longitudinal lateral body surface 615 to generate thrust in a direction perpendicular to second longitudinal lateral body surface 615. Tool 600 may include a second motor 636a to rotate second propeller 635 and a third motor 639a to rotate third propeller 638. In some embodiments, second propeller 636 is positioned within a second opening 614a formed through first longitudinal lateral body surface 614 and third propeller 638 is positioned within a third opening 615a formed through second longitudinal lateral body surface 615. Second and third propellers 635, 638 may stabilize tool 600, for example, in response to a wind gust, to maintain a desired vertical orientation of tool 600 and/or to stabilize tool 600 with respect to, e.g. the vertical (or substantially vertical) surface (e.g., as described below with respect to FIG. 8).

In some embodiments, tool 600 includes a liquid tank 650 and a liquid dispenser 652 connected to or disposed on body 610. Liquid tank 650 may accommodate a liquid (e.g., windows cleaning liquid). Liquid dispenser 652 may dispense the liquid from liquid tank 650 on the vertical surface (e.g., the window). In some embodiments, tool 600 includes a squeegee 654 connected to or disposed on first body end 610a. Squeegee 654 may squeegee the liquid from the vertical surface. In some embodiments, squeegee 654 may rotate about a squeegee rotation axis 655 that is parallel to central transverse frame axis 616 between a first squeegee position 654a and a second squeegee position 654b. In first squeegee position 654a, squeegee 654 may contact the vertical surface and squeegee the liquid therefrom. In second position, 654b squeegee 654 may not contact the vertical surface.

Tool 600 may include a controller 660. Controller 660 may control propellers 630, 636 and 638 of tool 600 to generate desired thrusts in respective directions.

In some embodiments, tool 600 includes a first set of sensors 662 connected to or disposed on body 610 at first body end 610a. In some embodiments, tool 600 includes a second set of sensors 664 connected to or disposed on body 610 at second body end 610b. Each of first and second sets of sensors 662, 664 includes at least one of one or more distance sensors (e.g. ToF sensors) and one or more optical sensors. Controller 660 may detect obstacles based on output signals from first and second sets of sensors 662, 664, and control at least first propeller 630 of tool 600 to overcome the detected obstacles (e.g., as described below with respect to FIG. 7).

In some embodiments, tool 600 includes a third set of sensors 666 connected to or disposed on body 610. Third set of sensors 666 may include inertial sensors such as, for example, one or more accelerometers, one or more gyros, etc. Controller 666 may control at least second and third propellers 635, 638 of tool 600 based on output signals from third set of sensors to maintain the desired vertical orientation of tool 600 and/or to stabilize tool 600, e.g. with respect to the vertical (or substantially vertical) surface (e.g., as described below with respect to FIG. 8).

In some embodiments, tool 600 includes a communication unit 668 connected to or disposed on body 610. Communication unit 668 may send and receive information. In some embodiments, communication unit 668 is a wireless communication unit containing a modem and an antenna. For example, communication unit 668 may send and receive information to/from device 100, slider 1220 and/or base unit 500.

In some embodiments, tool 600 includes a power source 669. In some embodiments, power source 669 includes rechargeable batteries. In various embodiments, tool 600 receives power from device 100 or slider 1220 (e.g., via cable 70 or dedicated power supply cable).

Reference is now made to FIG. 7, which shows schematic illustrations of tool 600 overcoming an obstacle 92 during operation on a vertical surface 90, according to some embodiments of the invention.

Illustrations 700a to 700d in FIG. 7 schematically show a side view of vertical surface 90 having an obstacle 92, and tool 600. Illustrations 700a to 700d in FIG. 7 schematically show tool 600 overcoming obstacle 92.

In illustration 700a, tool 600 is being pushed against vertical surface 90 by thrust 634a being generated by first propeller 630 rotating in first direction 633a. Tool 600 is being moved in a vertical (e.g., downwards) direction 702 by unwinding cable 70. Vertical surface 90 may include obstacles 92 that may prevent vertical movement of tool 600 thereon. For example, obstacle 92 may be a window frame, etc. Controller 660 of tool 600 may detect obstacle 92 based on output signals from first and/or second sets of sensors 662, 664. When tool 600 is being moved upwards on vertical surface 90 by winding cable 70 (e.g., in a vertical direction opposite to vertical direction 702 shown in FIG. 7), obstacle 92 may be further detected based torque values generated by a motor of a winch to which tool 600 is connected. For example, torques higher than a predefined threshold may indicate that tool 600 is unable to move upwards due to obstacle 92. Controller 660 and first and second sets of sensors 662, 664 are not shown in FIG. 7 for sake of clarity.

Upon detection of obstacle 92, controller 160 may control first propeller 630 to rotate in second direction 633b to generate thrust 634b to push tool 600 away from vertical surface 90 in a substantially horizontal direction 704, as shown in illustration 700b.

Tool 600 may be further moved in vertical direction 702 by further unwinding cable 70 to overcome obstacle 92, as shown in illustration 700c.

Controller 660 may further determine based on output signals from first and/or second set of sensors 662, 664 that there are no obstacles on vertical surface 90 that may prevent vertical movement of tool 600 thereon. Upon the determination, controller 660 may further control first propeller 630 to rotate in first direction 633a to generate thrust 634a to push tool 600 against vertical surface 90, as shown in illustration 700d. Tool 600 may be further moved in vertical direction 702 by unwinding cable 70.

Figure 8:
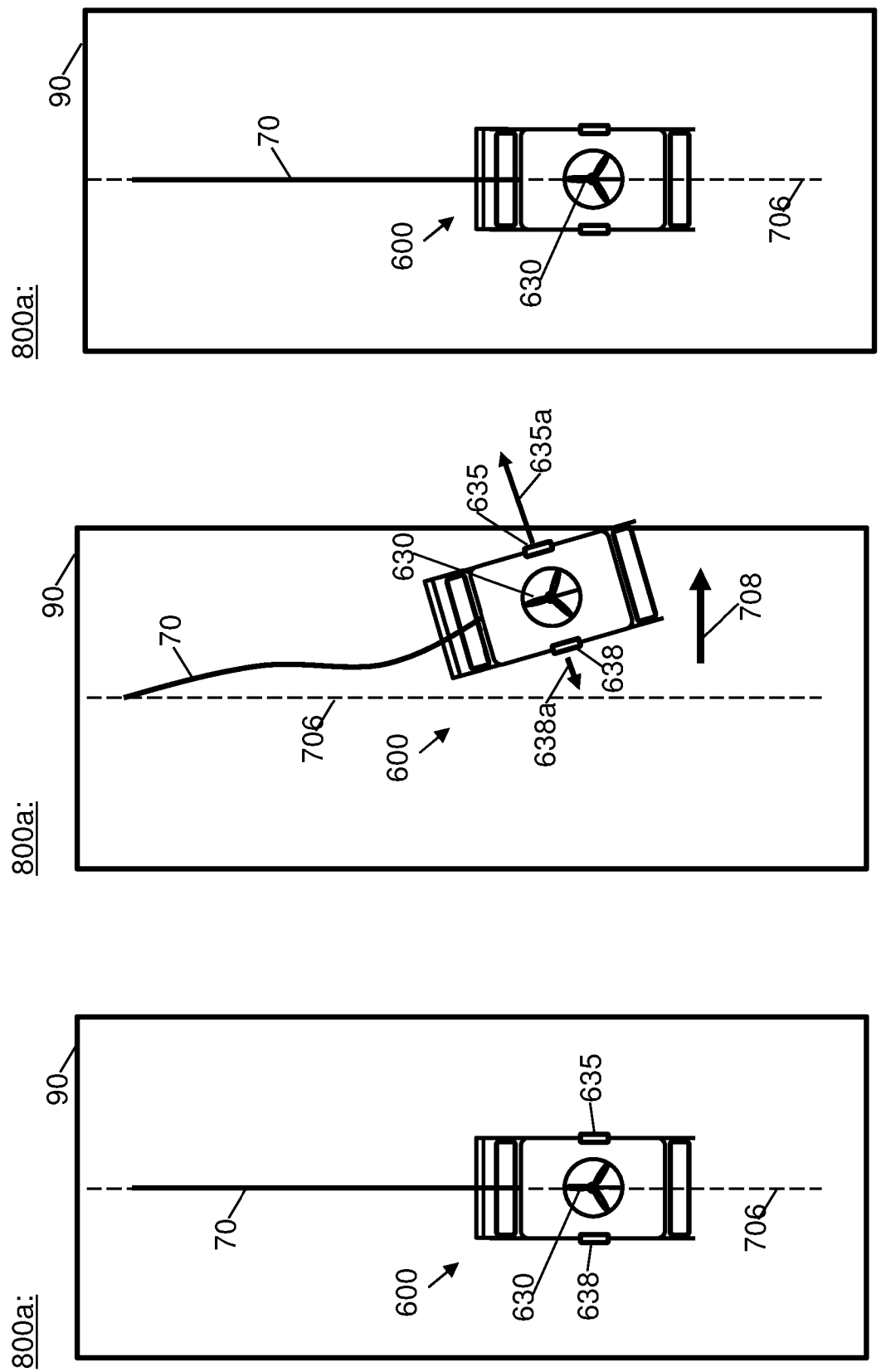
FIG. 8 shows schematic illustrations of the vertical surface cleaning tool maintaining a desired vertical orientation with respect to the vertical surface during operation on the vertical surface, according to some embodiments of the invention.

Reference is now made to FIG. 8, which shows schematic illustrations of tool 600 maintaining a desired vertical orientation with respect to a vertical surface 90 during operation on vertical surface 90, according to some embodiments of the invention.

Illustrations 800a to 800c in FIG. 8 schematically show a front view of vertical surface 90 and tool 600. Illustrations 800a to 800c in FIG. 8 schematically show tool 600 maintaining a desired vertical orientation with respect to a vertical surface 90.

In illustration 800a, tool 600 is attached to vertical surface 90 by thrust being generated by first propeller 630. Tool 600 is aligned with a desired vertical axis 706 as shown in illustration 800a.

Tool 600 may be displaced with respect to desired vertical axis 706, for example in a substantially horizontal direction 708 as shown in illustration 800b, due to, for example a wind gust. Controller 660 may determine the displacement of tool 600 based on output signals from third set of sensors 666. Controller 660 and third set of sensors 666 are not shown in FIG. 8 for sake of clarity.

Controller 660 may further control rotations of second and third propellers 635, 638 to generate thrusts 635a, 638a in respective directions as shown in illustration 800b to align tool 600 with desired vertical axis 706 and/or to stabilize tool 600, e.g. with respect to the vertical (or substantially vertical) surface, as shown in illustration 800c.

Figure 9:
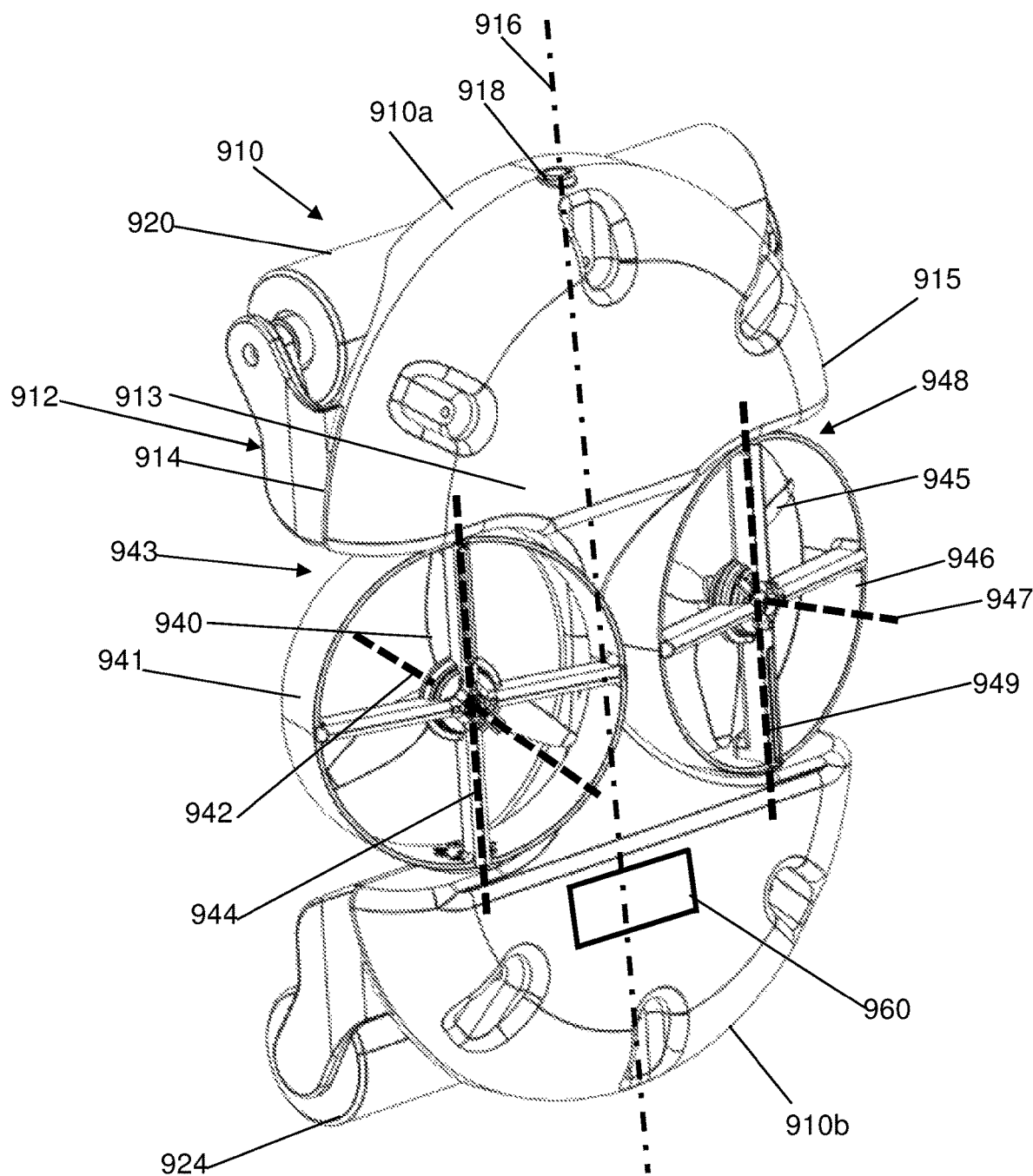
FIG. 9 is a 3D diagram of a vertical surface cleaning tool including two propellers, according to some embodiments of the invention.

Reference is now made to FIG. 9, which is a schematic illustration of a vertical surface cleaning tool 900 including two propellers, according to some embodiments of the invention.

Tool 900 may include body 910. Body 910 may include a first body end 910a, a second body end 910b, a front body surface 912 (facing the vertical surface when tool 900 is in operation), a rear flat body surface 913 (facing away from the vertical surface when tool 900 is in operation), a first longitudinal lateral body surface 914 and a second longitudinal lateral body surface 915. Body 910 may include a central longitudinal body axis 916 extending between first and second body ends 910a, 910b. At least front body surface 912 (facing the vertical surface when tool 900 is in operation) may be flat (or substantially flat). Rear body surface 913 may be flat (or substantially flat). Body 910 may be flat (or substantially flat).

Tool 900 may include a cable connector 918 to connect body 910 to cable 70 (e.g., cable 70 described hereinabove with respect to FIGS. 6A-6D). Cable connector 918 may be disposed at, e.g. first body end 910a of body 910.

Tool 900 may include one or two brushes—e.g., a first brush 920 connected to first body end 910a and a second brush 924 connected to second body end 910b (e.g., such as first and second brushes 620, 624, respectively, described above with respect to FIGS. 6A-6D).

In some embodiments, tool 900 includes a first propeller 940 and a second propeller 945 to generate thrusts to push tool 900 against the vertical surface or push tool 900 away from the vertical surface and maintain the desired vertical orientation of tool 900. First propeller 940 and second propeller 945 may be connected to or disposed on body 910.

For example, first propeller 940 may be connected or disposed within a within a first indent 943 being part of first longitudinal lateral body surface 914. First propeller 940 may be connected or disposed within a first frame (e.g. circular frame) 941. First propeller 940 may rotate about a first propeller rotation axis 942 that is perpendicular (or substantially perpendicular) to central longitudinal body axis 916. First frame 941 may rotate with respect to body 910 about a first frame rotation axis 944 that is parallel (or substantially parallel) to central longitudinal body axis 916. Tool 900 may include a first motor (not shown in FIG. 9 for sake of clarity) to rotate first propeller 940 about first propeller rotation axis 942. Tool 900 may include a second motor (not shown in FIG. 9 for sake of clarity) to rotate first circular frame 941 about first circular frame rotation axis 944.

In this example, second propeller 945 may be connected or disposed within a second indent 948 being part of second longitudinal lateral body surface 915. Second propeller 945 may be connected or disposed within a second frame (e.g. circular frame) 946. Second propeller 945 may rotate about a second propeller rotation axis 947 that is perpendicular (or substantially perpendicular) to central longitudinal body axis 916. Second frame 946 may rotate with respect to body 910 about a second circular frame rotation axis 949 that is parallel (or substantially parallel) to central longitudinal body axis 916. Tool 900 may include a third motor (not shown in FIG. 9 for sake of clarity) to rotate second propeller 945 about second propeller rotation axis 947. Tool 900 may include a fourth motor (not shown in FIG. 9 for sake of clarity) to rotate second circular frame 946 about second circular frame rotation axis 949.

Tool 900 may include a controller 960. Controller 960 may control rotations of first and second propellers 940, 945 and rotation of first and second frames 941, 946 to generate thrusts to push tool 900 against the vertical surface or push tool 900 away from the vertical surface, overcome obstacles (e.g. as described above with respect to FIG. 7) maintain the desired vertical orientation of tool 900 and/or stabilize tool 900, e.g. with respect to the vertical (or substantially vertical) surface (e.g. as described above with respect to FIG. 8). First and second propellers 940, 945 may thus replace first, second and third propellers 630, 635, 638 of tool 600.

In some embodiments, tool 900 includes a first set of sensors connected to or disposed on body 910 (e.g. at first body end 910*a*) and a second set of sensors connected to or disposed on body 910 (e.g. at second body end 910*b*). Each of the first and second sets of sensors may include at least one of one or more distance sensors (e.g. ToF sensors) and one or more optical sensors. The first and second sets of sensors may be similar to first and second sets of sensors 662, 664 described above with respect to FIGS. 6A-6C. The first and second sets of sensors are not shown in FIG. 9 for sake of clarity. Controller 960 may detect obstacles based on output signals from the first and second sets of sensors and control rotations of first and second propellers 940, 945 and rotations of first and second circular frames 941, 946 to overcome the detected obstacles (e.g., as described above with respect to FIG. 7).

In some embodiments, tool 900 includes a third set of sensors connected to or disposed on body 910. The third set of sensors may include inertial sensors such as, for example, one or more accelerometers, one or more gyros, etc. The third set of sensors may be similar to third set of sensors 666 described above with respect to FIGS. 6A-6C. The third set of sensors is not shown in FIG. 9 for sake of clarity. Controller 960 may control rotations of first and second propellers 940, 945 and rotations of first and second circular frames 941, 946 based on output signals from the third set of sensors to maintain the desired vertical orientation of tool 900 and/or stabilize tool 900, e.g. with respect to the vertical (or substantially vertical) surface (e.g., as described above with respect to FIG. 8).

In some embodiments, tool 900 includes a liquid tank, a liquid dispenser and a squeegee (e.g., such as liquid tank 650, liquid dispenser 652 and squeegee 654 described above with respect to FIGS. 6A-6C). In some embodiments, tool 900 includes a communication unit (e.g., such as communication unit 668 described above with respect to FIGS. 6A-6C). In some embodiments, tool 900 includes a power source (e.g., such as power source 669). In various embodiments, tool 900 receives power from device 100 or slider 1220 (e.g., via cable 70 or dedicated power supply cable).

Figure 10A:
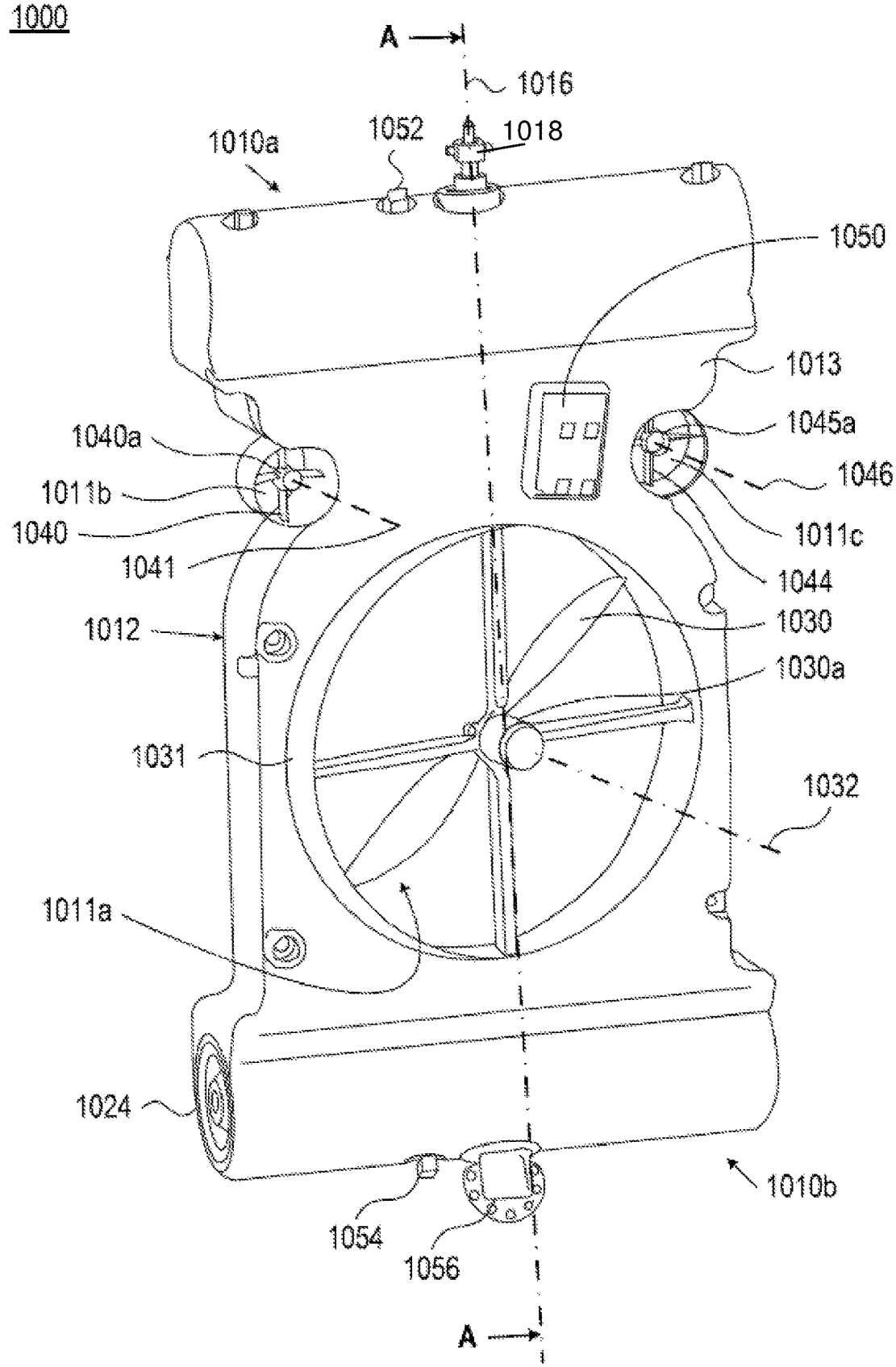
FIGS. 10A and 10B are 3D diagrams of a vertical surface cleaning tool including three propellers disposed within openings formed through front and rear body surfaces of the tool, according to some embodiments of the invention.
Figure 10B:
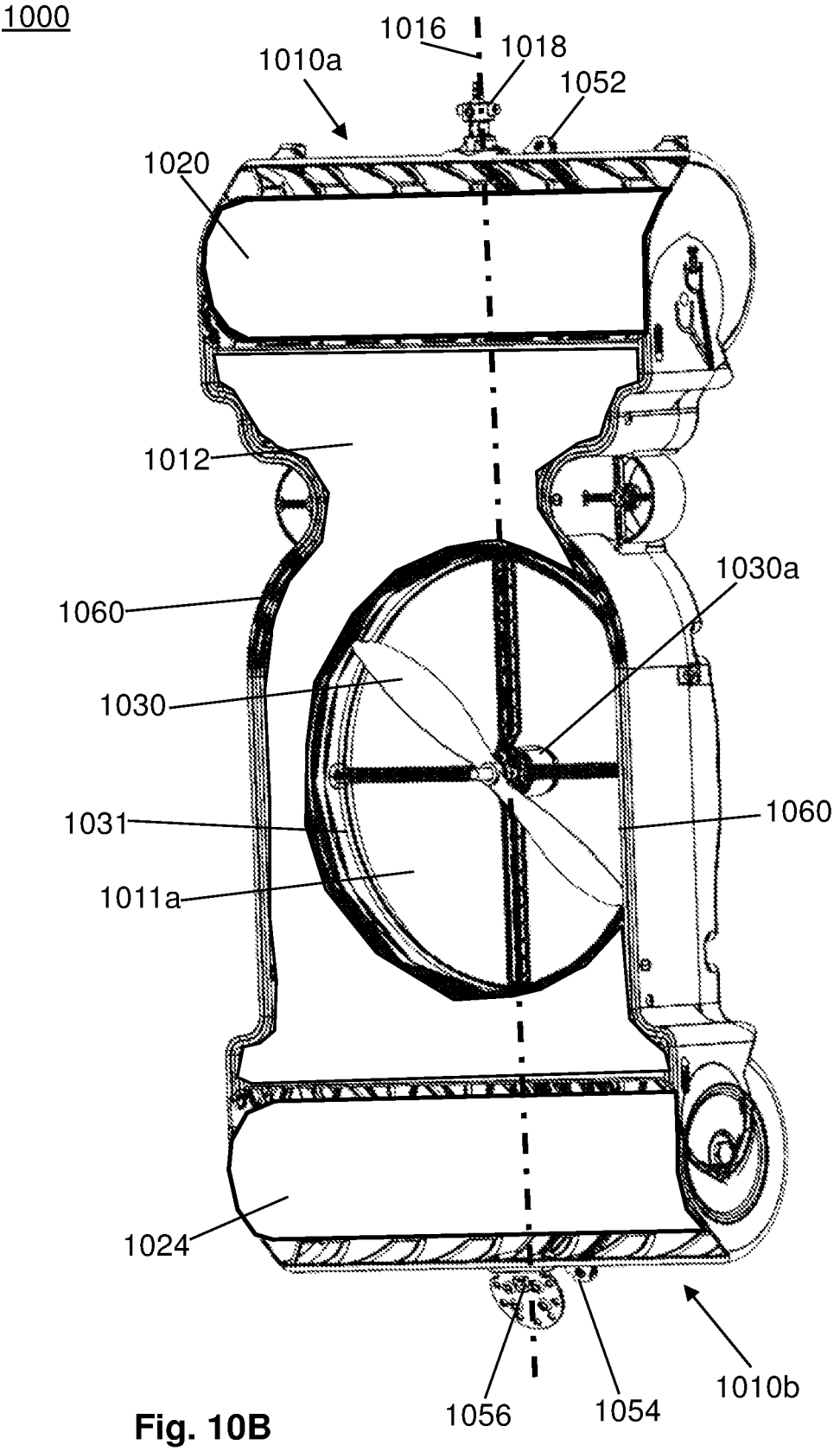

Reference is now made to FIGS. 10A and 10B, which are 3D diagrams of a vertical surface cleaning tool 1000 including three propellers disposed within openings formed through front and rear body surfaces of tool 1000, according to some embodiments of the invention. FIGS. 10A and 1B show different perspective views of tool 1000.

Figure 10C:
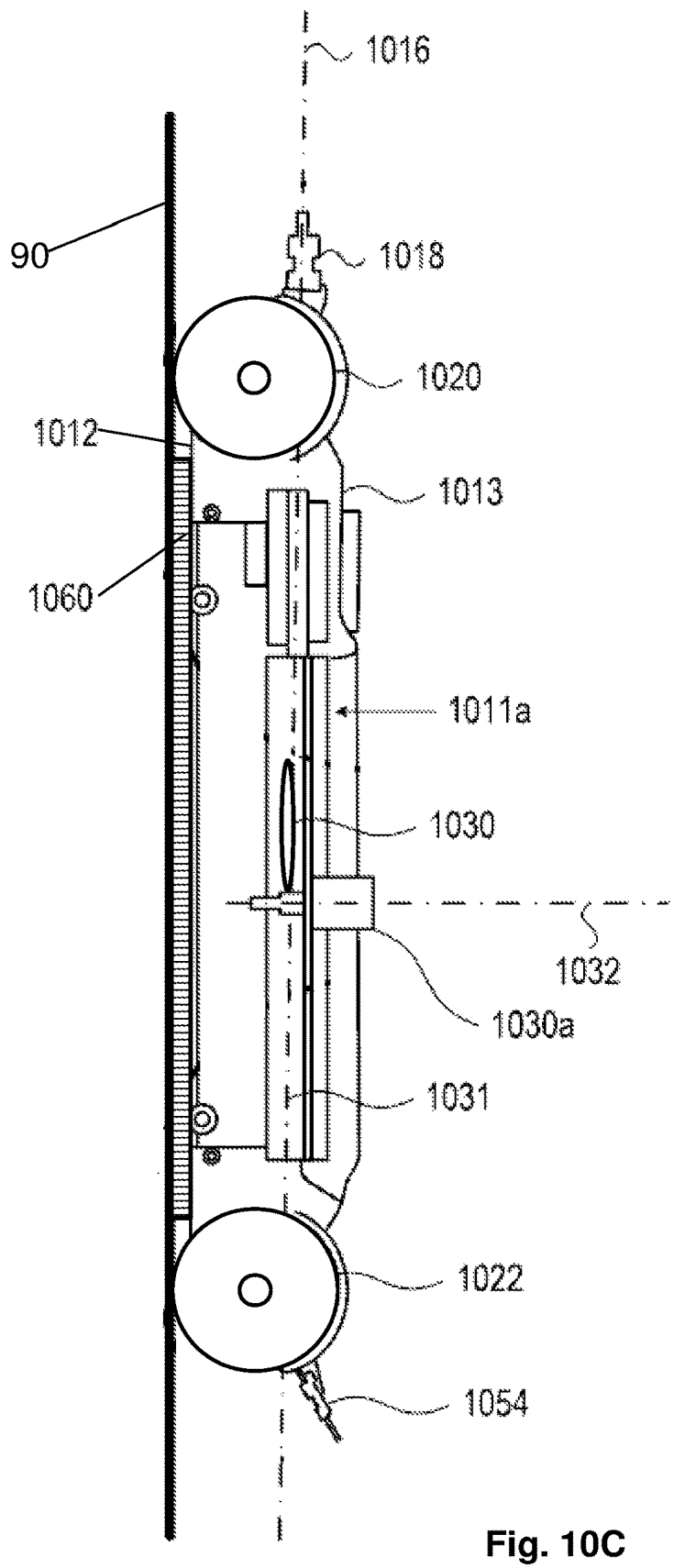
FIG. 10C is partial sectional view of vertical surface cleaning tool along line AA of FIGS. 10A-10B, according to some embodiments of the invention.

Reference is also made to FIG. 10C, which is a partial sectional view of vertical surface cleaning tool 1000 along line AA of FIGS. 10A-10B, according to some embodiments of the invention.

Tool 1000 may include a body 1010. Body 1010 may include a first body end 1010*a*, a second body end 1010*b*, a front body surface 1012 (facing the vertical surface when tool 1000 is in operation), a rear body surface 1013 (facing away from the vertical surface when tool 1000 is in operation), a first longitudinal lateral body surface 1014 and a second longitudinal lateral body surface 1015. Body 1010 may include a central longitudinal body axis 1016 extending between first and second body ends 1010*a*, 1010*b*. Body 1010 may be flat (or substantially flat). At least front body surface 1012 (facing the vertical surface when tool 1000 is in operation) may be flat (or substantially flat). Rear body surface 1013 may be flat (or substantially flat).

Tool 1000 may include a cable connector 1018 to connect body 1010 to cable 70 (e.g., cable 70 described hereinabove with respect to FIGS. 6A-6D). Cable connector 1018 may be disposed at, e.g. first end 1010*a* of body 1010.

Tool 900 may include one or two brushes—e.g., a first brush 1020 connected to first body end 1010*a* and a second brush 1024 connected to second body end 1010*b* (e.g., such as first and second brushes 620, 624, respectively, described above with respect to FIGS. 6A-6D).

Tool 1000 may include a first propeller 1030 to generate thrust in a first direction that is perpendicular (or substantially perpendicular) to front and rear body surfaces 1012, 1013 to push tool 1000 against the vertical surface. First propeller 1030 may be connected to or disposed on body 1010. For example, first propeller 1030 may be connected or disposed a first opening or bore 1011*a* formed through front and read body surfaces 1012, 1013. First propeller 1030 may be connected or disposed within a frame (e.g. circular frame) 1031. First propeller 1030 may rotate about a first propeller rotation axis 1032 that is perpendicular (or substantially perpendicular) to central longitudinal body axis 1016 to generate thrust to push tool 1000 against the vertical surface. Frame 1031 may rotate within first opening 1011*a* with respect to body 1010 about central longitudinal body axis 1016. Rotation of circular frame 1031 and first propeller 1030 about circular frame rotation axis 1034 may, for example, stabilize tool 1000 with respect to central longitudinal body axis 1016. Tool 1000 may include a first motor 1030*a* to rotate first propeller 1030 about first propeller rotation axis 1032.

Tool 1000 may include a second propeller 1040 and a third propeller 1045. Second and third propellers 1040, 1045 may be connected to or disposed on body 1010. Second and third propellers 1040, 1045 may be connected or disposed within a second opening or bore 1011*b* and a third opening or bore 1011*c*, respectively, formed through front and read body surfaces 1012, 1013. Second and third propellers 1040, 1045 may be disposed at opposing sides of central longitudinal body axis 1016 with respect to each other. Second propeller 1040 may rotate about a second propeller rotation axis 1041 that is perpendicular (or substantially perpendicular) to central longitudinal body axis 1016. Third propeller 1045 may rotate about a third propeller rotation axis 1046 that is perpendicular (or substantially perpendicular) to central longitudinal body axis 1016. Second and third propellers 1040, 1045 may generate thrusts in a second direction that is perpendicular (or substantially perpendicular) to flat body surface 1013 and opposite to the first direction to push tool 1000 away from the vertical (or substantially vertical) surface. Tool 1000 may include a second motor 1040*a* to rotate second propeller 1040 and a third motor 1045*a* to rotate third propeller 1045. Coordinated operation of second and third propellers 1040, 1045 may, for example, cause tool 1000 to flip with respect to central longitudinal body axis 1016, e.g. in the case when tool 1000 unintentionally flips around central longitudinal body axis 1016.

Tool 1000 may include a controller 1050. Controller 1050 may control rotations of first, second and third propellers 1030, 1040, 1045 and rotation of circular frame 1031 to generate thrusts to push tool 1000 against the vertical surface (e.g. to clean the vertical surface), push tool 1000 away from the vertical surface (e.g. to overcome obstacles as described above with respect to FIG. 7), stabilize tool 1000 and/or maintain the desired vertical orientation of tool 1000 (e.g. as described above with respect to FIG. 8).

In some embodiments, tool 1000 includes a first set of sensors 1052 connected to or disposed on body 1010 at first body end 1010*a* and a second set of sensors 1054 connected to or disposed on body 1010 at second body end 1010*b*. Each of the first and second sets of sensors 1052, 1054 may include at least one of one or more distance sensors (e.g. ToF sensors) and one or more optical sensors. First and second sets of sensors 1052, 1054 may be similar to first and second sets of sensors 662, 664 described above with respect to FIGS. 6A-6C. Controller 1050 may detect obstacles based on output signals from first and second sets of sensors 1052, 1054 and control rotations of first, second and third propellers 1030, 1040, 1045 and rotations of first circular frame 1031 to overcome the detected obstacles (e.g., as described above with respect to FIG. 7).

In some embodiments, tool 1000 includes a third set of sensors 1056 connected to or disposed on body 1010. Third set 1056 of sensors may include inertial sensors such as, for example, one or more accelerometers, one or more gyros, etc. Third set 1056 of sensors may be similar to third set of sensors 666 described above with respect to FIGS. 6A-6C. Controller 1050 may control rotations of first, second and third propellers 1030, 1040, 1045 and rotation of circular frame 1031 to stabilize tool 1000 and/or maintain the desired vertical orientation of tool 1000 (e.g., as described above with respect to FIG. 8).

In some embodiments, tool 1000 includes a liquid tank, a liquid dispenser and a squeegee (e.g., such as liquid tank 650, liquid dispenser 652 and squeegee 654 described above with respect to FIGS. 6A-6C). In some embodiments, tool 1000 includes a communication unit (e.g., such as communication unit 668 described above with respect to FIGS. 6A-6C). In some embodiments, tool 1000 includes a power source (e.g., such as power source 669). In various embodiments, tool 900 receives power from device 100 or slider 1220 (e.g., via cable 70 or dedicated power supply cable).

One advantage of tool 1000 is that tool 1000 has relatively large first propeller 1030 (e.g. as compared to tools 600, 900 described above). Relatively large first propeller 1030 may be more efficient and may generate more airflow with less round per minute as compared to smaller propellers.

In some embodiments, tool 1000 includes one or more sealing members 1060 (e.g. as shown in FIGS. 10B and 10C). Sealing member(s) 1060 may be disposed on, for example, front body surface 1012 (facing vertical surface 90). For example, tool 1000 may include two sealing members 1060 disposed on front body surface 1012 at opposing sides of first propeller 1030/first opening 1011*a* with respect to each other (e.g. as shown in FIG. 10B). Sealing member(s) 1060 may, for example, include bristles (e.g. such as brush bristles). Sealing member(s) 1060 may, for example, generate negative pressure within first opening 1011*a*. The negative pressure may, for example, provide a vacuum cleaning effect to enhance cleaning of, e.g. dust from the vertical surface. The negative pressure may, for example, reduce noise generated by first propeller 1030 as compared to cases in which no negative pressure is generated.

Figure 11A:
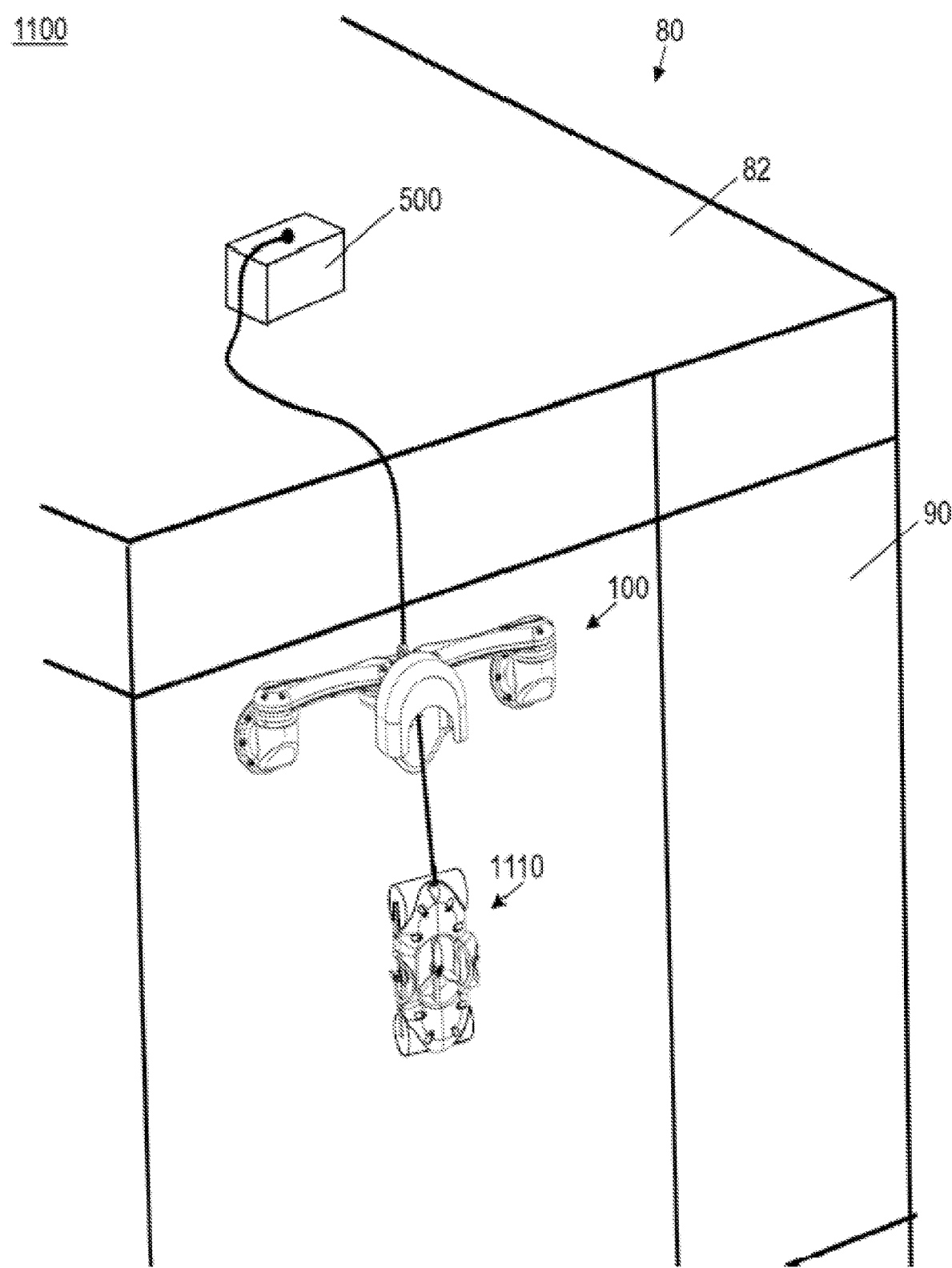

Reference is now made to FIG. 11A, which is a 3D diagram of a system 1100 for cleaning vertical surfaces of buildings, according to some embodiments of the invention.

Figure 11B:
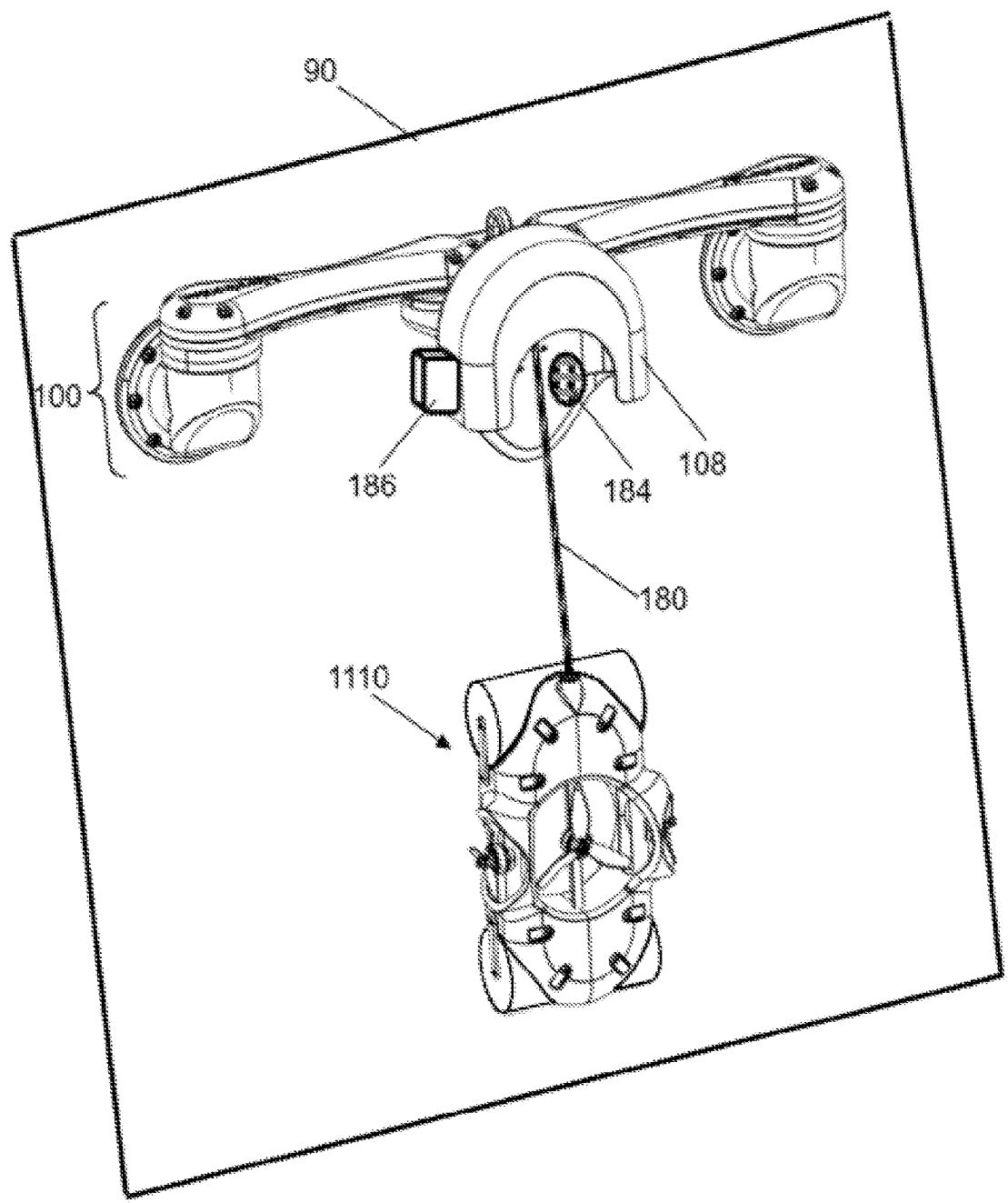
Figure 11C:
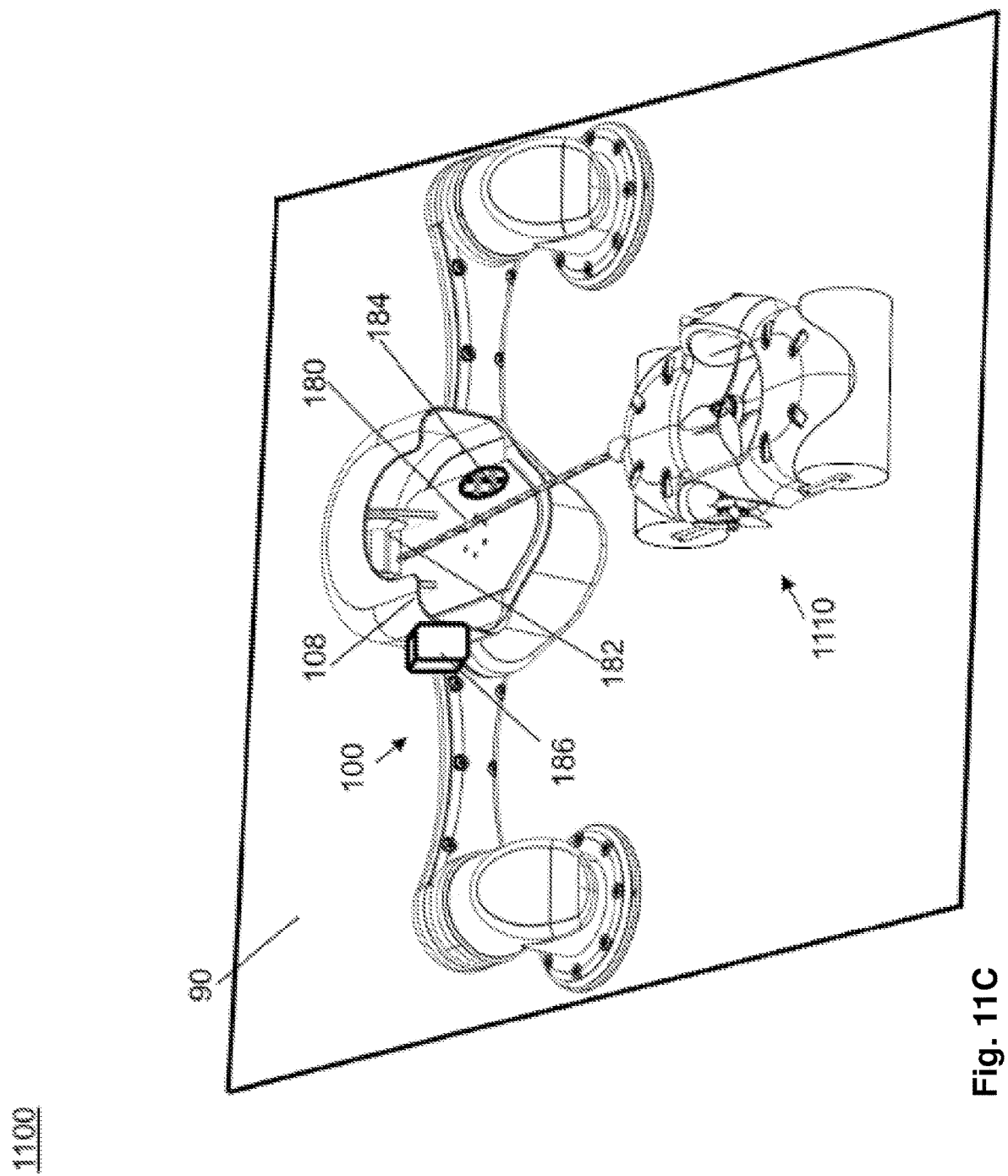

Reference is also made to FIGS. 11B and 11C, which are 3D diagrams of device 100 for moving on a vertical surface 90 and a tool 1110 for cleaning vertical surface 90, according to some embodiments of the invention.

System 1100 may include device 100 for moving on vertical surfaces (e.g., as descried above with respect to FIGS. 1A-1I, 2, 3, 4), base unit 500 (e.g., as described above with respect to FIGS. 5A, 5B and 5C) and a cleaning tool 1110 for cleaning vertical surfaces (e.g., such as tool 600, tool 900 or tool 1000 described above with respect to FIGS. 6A-6D, 7, 8, FIG. 9 and FIGS. 10A-10B). While tool 600 is shown in FIGS. 11A, 11B and 11C as cleaning tool 1110, cleaning tool 1110 may include any one of tools 600, 900, 1000 or any other suitable tool for cleaning vertical surfaces.

FIG. 11A shows a 3D diagram of building 80 having roof 82 and vertical surface 90 including walls and windows, and system 1100 operating on building 80 and cleaning vertical surface 90 thereof. FIG. 11A shows device 100 attached to vertical surface 90 of building 80 (e.g., as described above with respect to FIGS. 1A-1I, 2, 3, 4). Device 100 may move on vertical surface in horizontal and vertical directions (e.g., as described above with respect to FIGS. 2, 3, 4). FIG. 11A further shows base unit 500 mounted on roof 82 of building 80 and securing device 100 to base unit 500/roof 82 using cable 516 and/or supplying at least power to device 100 (e.g., as described above with respect to FIGS. 5A-5B). FIG. 11A further shows cleaning tool 1110 connected to device 100 and capable of being moved in vertical directions with respect to vertical surface 90 of building 80 to clean vertical surface 90 (e.g., as described above with respect to FIGS. 6A-6D, 7, 8 and FIG. 9).

FIGS. 11B and 11C show 3D diagrams of device 100 attached to vertical surface 90 and of tool 1110 connected to device 100 and cleaning vertical surface 90.

Tool 1110 may be connected to device 100 using a cable 180. Cable 180 may be connected at its first end to a cable connector of tool 1110 and at its second end to a winch 182 of the tool connector of device 100. Winch 182 may alternately wind and unwind cable 180 to adjust a vertical position of tool 1110 with respect to vertical surface 90.

Housing 108 of device 100 may releasably receive at least a portion of tool 1110. In some embodiments, device 100 includes a power interface 184 to charge a rechargeable battery of tool 1110 when the tool is received within housing 108. In some embodiments, tool 1110 receives power from device 100 (e.g. via cable 180 or other cable). In some embodiments, device 100 includes a liquid container 186 to fill a liquid tank of tool 1110 when tool 1110 is received within housing 108.

In some embodiments, controller 150 of device 100 controls components of system 1000. For example, controller 150 may store a cleaning plan of vertical surfaces 90 of building 80 and may control components of system 100 according to the cleaning plan. Controller 150 is not shown in FIGS. 11A-11C for sake of clarity.

Figure 12:
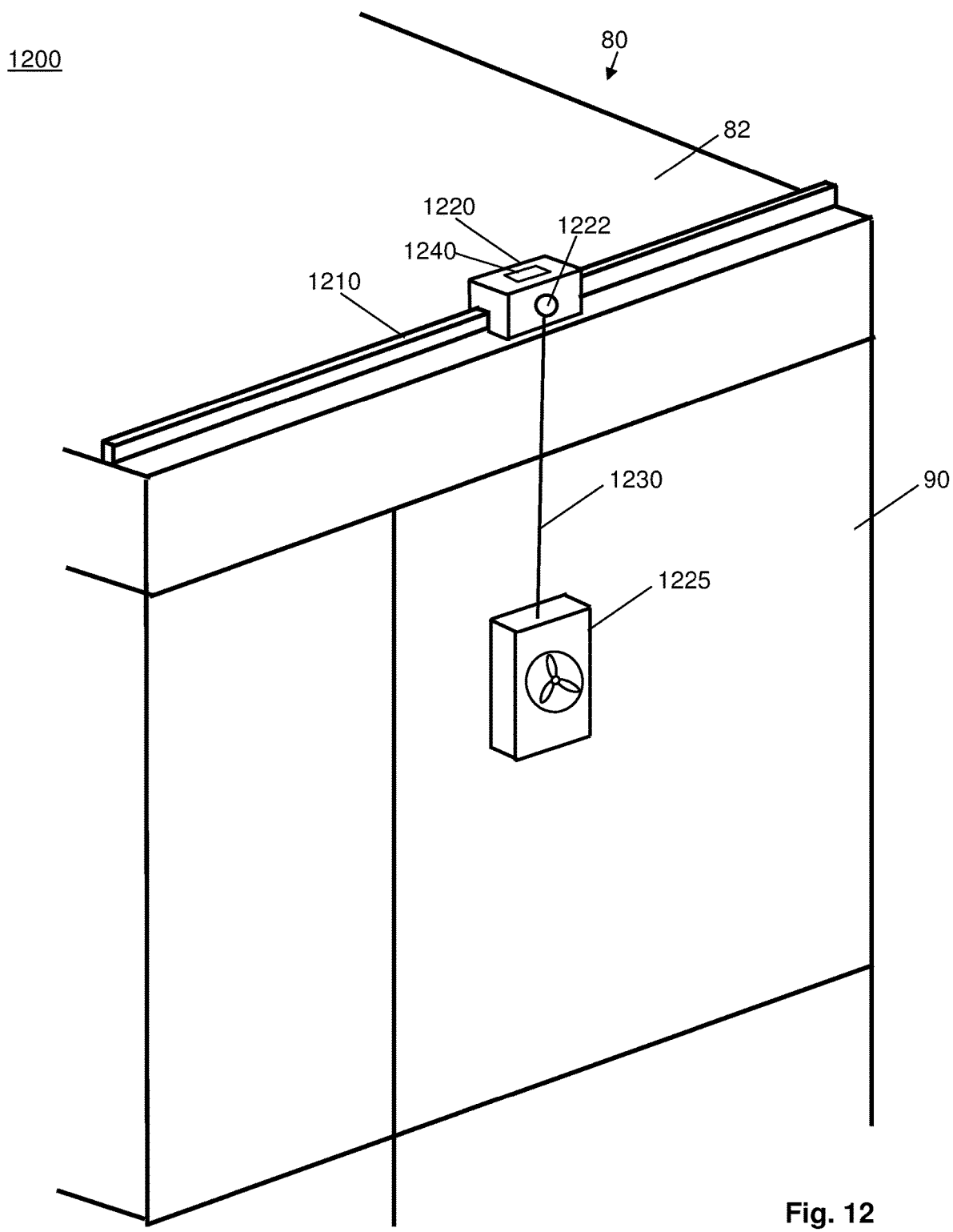
FIG. 12 is a schematic illustration of a system for cleaning vertical surfaces of buildings, according to some embodiments of the invention.

Reference is now made to FIG. 12, which is a schematic illustration of system 1200 for cleaning vertical surfaces of buildings, according to some embodiments of the invention.

System 1200 may include one or more rails 1210. Rails 1210 may be mounted on a roof 82 of a building 80. System 1200 may include a slider 1220. Slider 1220 may be connected to rail 1210 and may slide over rail 1210, e.g., in a horizontal direction.

System 1200 may include a tool 1225 for cleaning vertical surfaces (e.g., such as tool 600, tool 900, tool 1000 as described above with respect to FIGS. 6A-6D, 7, 8, FIG. 9 and FIGS. 10A-10B or any other suitable tool for cleaning vertical surfaces).

Tool 1225 may be connected to slider 1220 using a cable 1230. Cable 1230 may be connected at its first end to the cable connector of tool 1225 and at its second end to a winch 1222 of slider 1220. Winch 1222 may alternately wind and unwind cable 1230 to adjust a vertical position of tool 1225 with respect to vertical surface 90.

Slider 1220 may include a controller 1240. Controller 1240 may control components of system 1200. For example, controller 1240 may store a cleaning plan of vertical surfaces 90 of building 80 and may control components of system 1200 according to the cleaning plan.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for cleaning a substantially vertical surface, the system comprising:
    a device for moving on the substantially vertical surface, the device comprises:
        a cleaning tool connector,
        a frame,
        a first arm connected to the frame and rotatable with respect to the frame about a first axis,
        a first vacuum suction cup connected to the first arm,
        a second arm connected to the frame and rotatable with respect to the frame about a second axis that is substantially parallel to the first axis,
        a second vacuum suction cup connected to the second arm,
        a vacuum pump in fluid communication with the first vacuum suction cup and the second vacuum suction cup,
        a first valve to control generation of vacuum in and release of vacuum from the first vacuum suction cup,
        a second valve to control generation of vacuum in and release of vacuum from the second vacuum suction cup, and
        a controller to control:
            rotation of the first arm and the second arm, and
            operation of the vacuum pump, the first valve and the second valve; and
    a cleaning tool connectable to the cleaning tool connector, the cleaning tool is movable with respect to the device in a substantially vertical direction to clean the substantially vertical surface.

2. The system of claim 1, wherein the controller to control rotations of the first arm and the second arm, and operation of the vacuum pump, the first valve and the second valve to cause the device to move on the substantially vertical surface in a desired direction.

3. The system of claim 1, wherein the device comprises a camera and wherein the controller to cause the device to move on the substantially vertical surface in a desired direction based on images received from the camera.

4. The system of claim 1, wherein the first arm and the second arm are connected to opposite sides of the frame with respect to each other.

5. The system of claim 1,
    wherein the first arm and the first vacuum suction cup are rotatable with respect to each other about a third axis that is substantially parallel to the first axis, and
    wherein the second arm and the second vacuum suction cup are rotatable with respect to each other about a fourth axis that is substantially parallel to the second axis.

6. The system of claim 1,
    wherein the first arm and the first vacuum suction cup are rotatable with respect to each other about a fifth axis that is substantially perpendicular to the first axis,
    wherein the second arm and the second vacuum suction cup are rotatable with respect to each other about a sixth axis that is substantially perpendicular to the second axis.

7. The system of claim 1, wherein the device comprises:
    a first set of sensors disposed in the first vacuum suction cup, and
    a second set of sensors disposed in the second vacuum suction cup,
    wherein the controller is to determine, based on output signals from the first set of sensors and the second set of sensors, whether or not portions of the substantially vertical surface in front of the first vacuum suction cup and the second vacuum suction cup are appropriate for vacuum suction attachment.

8. The system of claim 1, wherein the device comprises:
    a sub-frame connected to the frame,
    wherein the first arm and second arm are connected to the sub-frame and are rotatable with respect to the sub-frame about the first axis and the second axis, respectively, and
    wherein the sub-frame and the frame are rotatable with respect to each other about a seventh axis that is substantially perpendicular to the first axis and the second axis.

9. The system of claim 8, wherein the controller to rotate the frame with respect to the sub-frame to maintain a substantially horizontal orientation of the frame when the device is disposed on the substantially vertical surface.

10. The system of claim 1, wherein the cleaning tool connector comprises:
a cleaning tool cable connectable to the cleaning tool, and
a cleaning tool winch to alternately wind and unwind the cleaning tool cable; and
wherein the controller to control operation of the cleaning tool winch to move the cleaning tool with respect to the device in the substantially vertical direction.

11. The system of claim 1, wherein the device comprises a housing to releasably receive at least a portion of the cleaning tool.

12. The system of claim 1, wherein the cleaning tool comprises:
a body having a first body end, a second body end, and a central longitudinal body axis extending between the first body end and the second body end,
a cable connector to connect the body to a cable of the cleaning tool connector of the device,
one or two brushes each rotatably connected to one of the first body end or second body end,
a propeller disposed on the body, the propeller is rotatable about a propeller rotation axis that is substantially perpendicular to the central longitudinal body axis to generate thrust to push the cleaning tool against the substantially vertical surface, and
a cleaning tool controller to control rotations of the propeller.

13. The system of claim 12, wherein the body comprises:
a front body surface to face the substantially vertical surface,
a rear body surface opposing to the front body surface,
an opening formed through the front body surface and the rear body surface,
wherein the propeller is disposed within the opening.

14. The system of claim 13, wherein the propeller is disposed within a frame, wherein the frame is rotatable within the opening about the central longitudinal body axis, and wherein the cleaning tool controller is to control rotation of the circular frame.

15. The system of claim 13, wherein the cleaning tool comprises:
a second propeller and a third propeller disposed on the body at opposing sides of the central longitudinal body axis with respect to each other,
wherein the second propeller and the third propeller are rotatable about a second propeller rotation axis and a third propeller rotation axis, respectively, that are substantially perpendicular to the central longitudinal body axis to generate thrust to push the cleaning tool away from the substantially vertical surface.

16. The system of claim 15, wherein the second propeller and the third propeller are disposed within a second opening and a third opening, respectively, formed through the front body surface and the rear body surface.

17. The system of claim 15, wherein the cleaning tool controller is to control rotations of the second propeller and the third propeller to push the cleaning tool away from the substantially vertical surface.

18. The system of claim 17, wherein the cleaning tool controller is to control rotations of the second propeller and the third propeller to overcome obstacles on the substantially vertical surface.

19. The system of claim 17, wherein the cleaning tool controller is to control rotations of the second propeller and the third propeller to stabilize the cleaning tool with respect to the substantially vertical surface.

20. The system of claim 13, wherein the cleaning tool comprises two sealing members disposed on the front body surface at opposing sides of the opening with respect to each other.

21. The system of claim 1, further comprising a base unit mountable on top of the substantially vertical surface, the base unit comprises:
a base unit cable connectable to the device to secure the device, and
a base unit winch to wind and unwind the base unit cable.

22. The system of claim 21, wherein the base unit comprises a cable inspection unit to detect defects in the base unit cable during at least one of winding and unwinding of the base unit cable.

* * * * *